United States Patent [19]
Watanabe et al.

[11] Patent Number: 5,184,262
[45] Date of Patent: Feb. 2, 1993

[54] DUAL MOTOR MODE SWITCHING MECHANISM FOR A RECORDING AND/OR REPRODUCING APPARATUS

[75] Inventors: Hisanori Watanabe, Kanagawa; Shinji Ito, Tokyo, both of Japan

[73] Assignee: Sony Corporation, Tokyo, Japan

[21] Appl. No.: 512,987

[22] Filed: Apr. 23, 1990

[30] Foreign Application Priority Data

Apr. 27, 1989 [JP] Japan .................................. 1-108773

[51] Int. Cl.⁵ ............................................. G11B 5/008
[52] U.S. Cl. .................................. 360/96.2; 360/137; 360/96.5
[58] Field of Search ............... 360/137, 88, 96.1, 96.2, 360/96.3, 96.5

[56] References Cited

U.S. PATENT DOCUMENTS

| | | | |
|---|---|---|---|
| 4,442,467 | 4/1984 | Ikedo | 360/96.2 |
| 4,583,139 | 4/1986 | Saito | 360/96.2 |
| 4,591,932 | 5/1986 | Aratami | 360/96.2 |

*Primary Examiner*—Stuart S. Levy
*Assistant Examiner*—Alfonso Garcia
*Attorney, Agent, or Firm*—Philip M. Shaw, Jr.

[57] ABSTRACT

The present disclosure is relative with a recording and/or reproducing apparatus employing a tape, such as a magnetic tape, as the recording medium, and provides a mode switching mechanism for such apparatus. The mechanism includes a swing arm provided with a transmission gear selectively rotated in dependence upon the rotational drive direction of a sole reel motor, a cam gear formed with interrupted portions and cam surfaces associated with these interrupted portions and adapted for selectively switching predetermined operational modes by the cam surfaces in dependence upon its rotational angular positions, a biasing member for rotationally biasing the cam gear, and a cam gear retention member for retaining the cam gear at a predetermined angular position. The reel shaft is rotationally driven by means of the transmission gear of the swing arm by driving the reel motor in the forward direction. The cam gear retention member is moved to release the retention of the cam gear by means of the transmission gear of the swing arm by driving the reel motor in the reverse direction so as to rotate the cam gear by the biasing member and the motor for switching the operational modes.

11 Claims, 23 Drawing Sheets

DUAL MOTOR MODE SWITCHING MECHANISM FOR A RECORDING AND/OR REPRODUCING APPARATUS

BACKGROUND OF THE INVENTION AND RELATED ART STATEMENT

This invention relates to a mode switching mechanism for a recording and/or reproducing apparatus for recording and/or reproducing information signals on or from a tape, such as a magnetic tape, as the recording medium.

In connection with such a recording and/or reproducing apparatus there is so far proposed a so-called reversible tape apparatus in which recording and/or reproduction is performed with the tape being selectively run in either the forward direction or the reverse direction.

A variety of types of such recording and/or reproducing apparatus are also proposed, in which predetermined cam surfaces are formed on a planar surface of a cam gear for selectively switching various operational modes, such as a forward (FWD) mode in which the recording tape is run in the forward direction for recording and/or reproduction, a reverse (REV) mode in which the magnetic tape is run in the reverse direction for recording and/or reproduction, a fast feed (FF) mode, a rewind (REW) mode or a stop (STOP) mode.

Such a recording and/or reproducing apparatus is so constructed that a mode switching mechanism for switching the various operational modes is actuated by a cam surface on rotation of the cam gear. The angular rotational positions of the cam gear are associated with the various operational modes. Thus a predetermined operational mode can be selected by rotating the cam gear by an electric motor and halting and positioning the cam gear at predetermined angular positions.

For example, the reversible type recording and/or reproducing apparatus which is provided with a mode switching mechanism, as proposed in our copending Japanese Patent Application No. 62-163353(1987), is so constructed that a pair of capstans for running the tape towards the forward or reverse side at constant speeds, a pair of reel shafts fitted with tape reels for taking up the tape and a sole cam gear for selectively switching a plurality of operational modes, are rotated by a sole driving motor. The apparatus is, in effect, what is called a one motor type tape recorder. With such a one-motor tape recorder, the drive power of the drive motor is transmitted to the capstans and reel shaft or the like by means of a drive power transmitting mechanism inclusive of drive belts or gears.

The cam gear has a peripheral gear formed with interrupted portions, and has cam surfaces and retained portions on its planar surface. This cam gear is positioned by the retained portion being retained by a cam gear retainer at a position in which the drive gear transmitting the drive power of the drive motor faces an associated one of the interrupted portions. The cam gear retention member is reciprocated between the retained position or the released position by means of a plunger and a biasing spring.

On rotation of the cam gear, the mode switching mechanism for switching the operational modes by the cam surface comes into operation. This mode switching mechanism switches the transmission route of the drive power by shifting the gear transmitting the drive power of the drive motor, and selects the desired operational mode by switching the direction of constant speed running of the tape by the selective abutment of the pinch roll against the capstans.

More specifically, for switching the operational modes in the above described recording and/or reproducing apparatus, the plunger is actuated to shift the cam gear retention member to release the retention of the cam gear, while the cam gear is rotated by a biasing member by way of initial triggering for engaging the drive gear with the gear section to rotate the cam gear. This actuates the mode switching mechanism to switch the tape running direction. This mode switching mechanism is actuated responsive to the angular position of rotation of the cam gear to effect switching to the desired operational mode associated with the angular position of rotation. Hence, the operation of the plunger is released when switching to the desired operational mode has been made, and the cam gear is again retained and positioned by the cam gear retention member for establishing the desired operational mode.

With the above described one-motor type recording and/or reproducing apparatus, the capstan pair and the reel shaft are rotationally driven by one and the same driving motor. The result is that the rotational load applied by the tape to the reel shaft is transmitted to the capstans so that the rotational speed of the capstans can be maintained at a high accuracy only with difficulty and so-called wow and flutter is produced to render it difficult to maintain satisfactory recording and/or reproducing characteristics.

With the above recording and/or reproducing apparatus, it is necessary to switch the torque or speed of rotation of the reel shaft between the recording and/or reproducing (forward or reverse) modes and the fast feed or rewind modes. This complicates the arrangement because a plurality of drive power transmitting mechanisms need be provided to provide for different speeds or rotational torques of the drive motor to the reel shaft with the use of what is called a torque limiting mechanism.

With a two-motor tape recorder in which the capstans and the reel shaft are rotationally driven by a separate dedicated capstan motor and a reel motor, respectively, it becomes possible to maintain the rotational speed of the capstans at a high accuracy to suppress wow and flutter. The drive power transmitting mechanism to the reel shaft can also be simplified by commuting the amounts of currents to the reel motor for switching the rotational speed of the reel shaft or the rotational torque between the recording and/or reproducing mode and the fast feed or rewind mode.

However, with the use of two driving motors, three separate driving means, that is these two driving motors and a plunger, are necessitated, thus complicating the arrangement and the assembling process, while elevating the costs.

OBJECT AND SUMMARY OF THE INVENTION

It is therefore an object of the present invention to provide a mode switching mechanism for a recording and/or reproducing apparatus in which the rotational speed of the capstans can be maintained at high accuracy without complicating the arrangement to suppress wow and flutter, and in which a plurality of operational modes can be selected freely.

In accordance with the present invention, there is provided a mode switching mechanism in an apparatus for recording and/or reproducing signals from or onto tape wound on a supply reel and a take up reel, the mechanism comprising at least one capstan;

a capstan motor for rotationally driving at least the one capstan, a pair of reel gears for driving the supply and take up reels;

a reel motor for selectively driving the reel gears, the reel motor being rotatable in either direction;

transmission gear means for transmitting the drive power of the reel motor;

movable swing arm means for rotatably supporting the transmission gear means, the movable swing arm means being movable selectively in first and second directions in dependence upon the rotational direction of the reel motor;

intermediate gear means for selectively transmitting the drive power from the transmission gear means to the reel gears;

drive gear means rotationally driven by the capstan motor;

cam gear means having a peripheral gear section inclusive of interrupted portions and also having a cam surface section, a triggered section and a retained portion on a major planer surface, the cam gear means being rotationally driven in one direction by means of the gear section by the drive gear means;

mode switching means for selectively switching and setting a plurality of operational modes by the cam surface section in dependence upon the rotational angular position of the cam gear means;

cam retention gear means having a retainer for retaining the retained portion of the cam gear means and being movably supported between a first position in which the retainer retains the retained portion and the rotational angular position of the cam gear is set to a position in which the interrupted portions face the drive gear means and a second position of releasing the retention between the retainer and the retained portion; and trigger means for thrusting the triggered section for rotationally biasing the cam gear means in one direction;

wherein the reel motor can be rotationally driven in a forward direction to shift the reel motor in the first direction for rotationally driving the reel gears, and the reel motor can be rotationally driven in the reverse direction for shifting the swing arm means in the second direction, the cam gear retention means being moved from the first position to the second position to release the retention between the retainer and the retained portion, and the cam gear means being rotationally driven for driving the mode switching means for switching the operational modes.

Other objects and advantages of the present invention will become more apparent from the following description of certain preferred embodiments thereof which is made in conjunction with the accompanying drawings.

DESCRIPTION OF PREFERRED EMBODIMENTS

Figure 1:
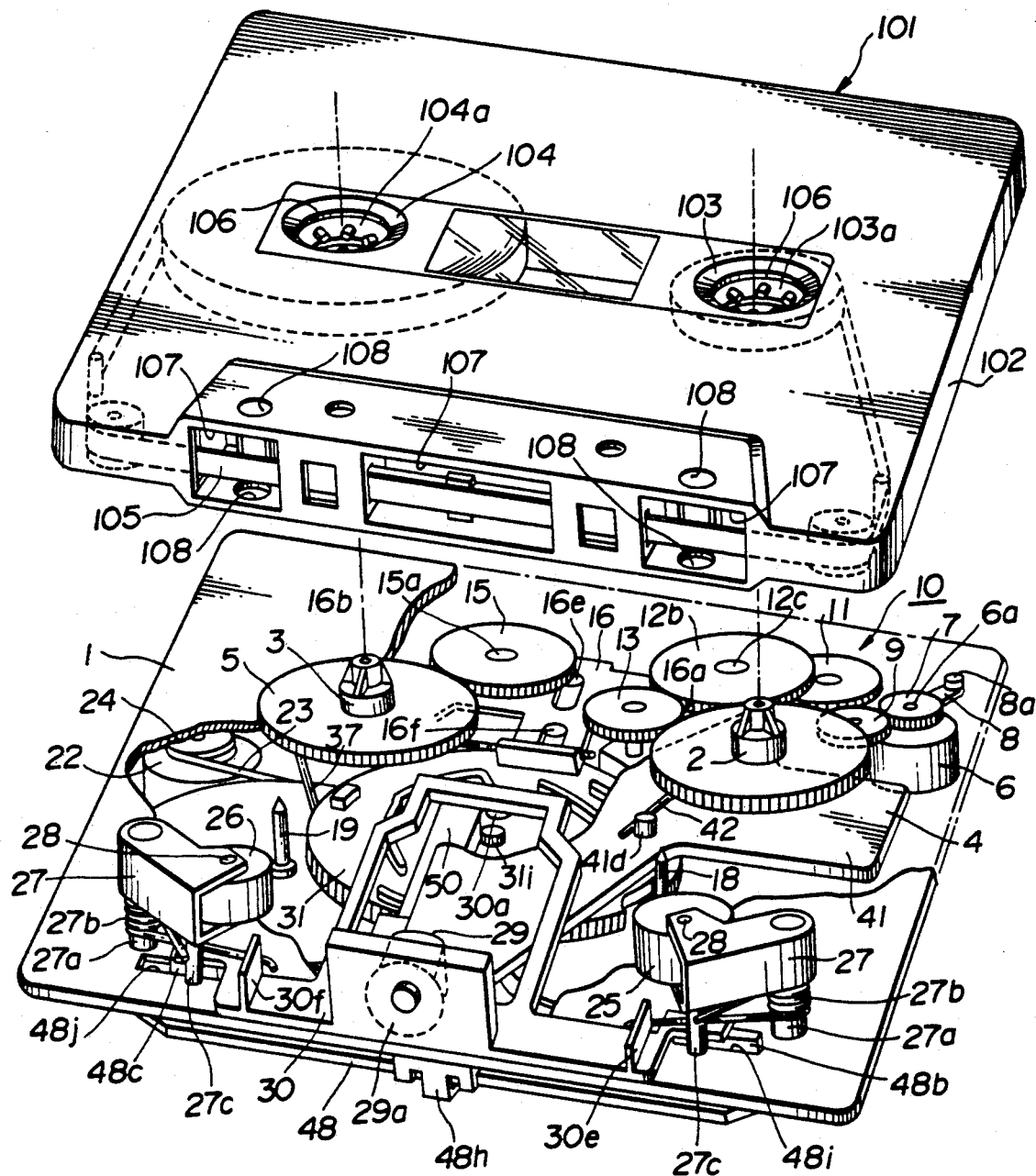
FIG. 1 is a perspective view, partially broken away, and illustrating the recording and/or reproducing apparatus according to the present invention.

Referring to the drawings, certain preferred embodiments of the present invention will be explained in detail.

In the present embodiment, the present invention is applied to a tape recorder in which recording and/or reproduction of information signals is performed using a standard size tape cassette comprised of a magnetic tape enclosed within two cassette halves.

Figure 2:
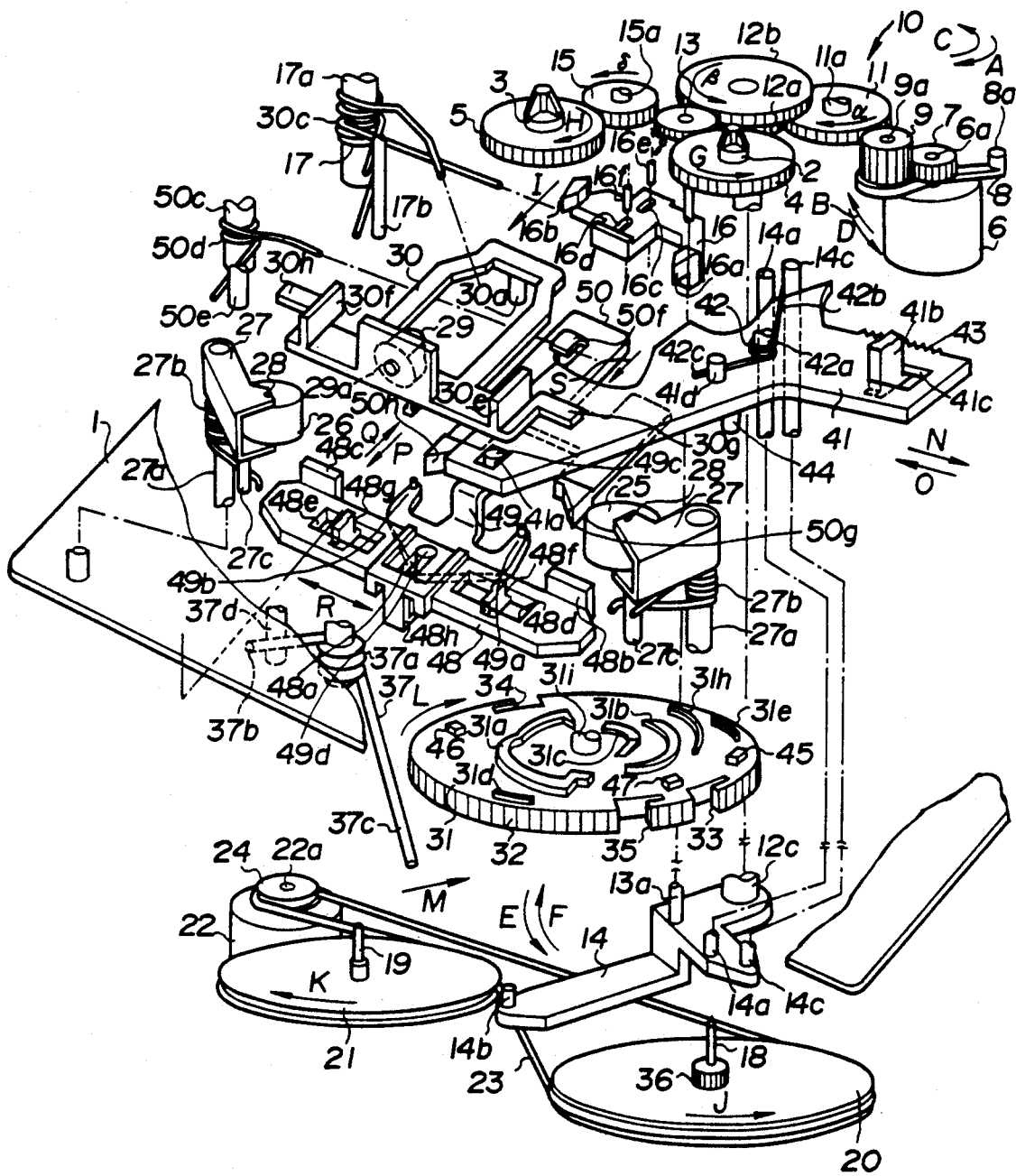
FIG. 2 is an exploded perspective view illustrating the mode switching mechanism of the recording and/or reproducing apparatus.
Figure 9:
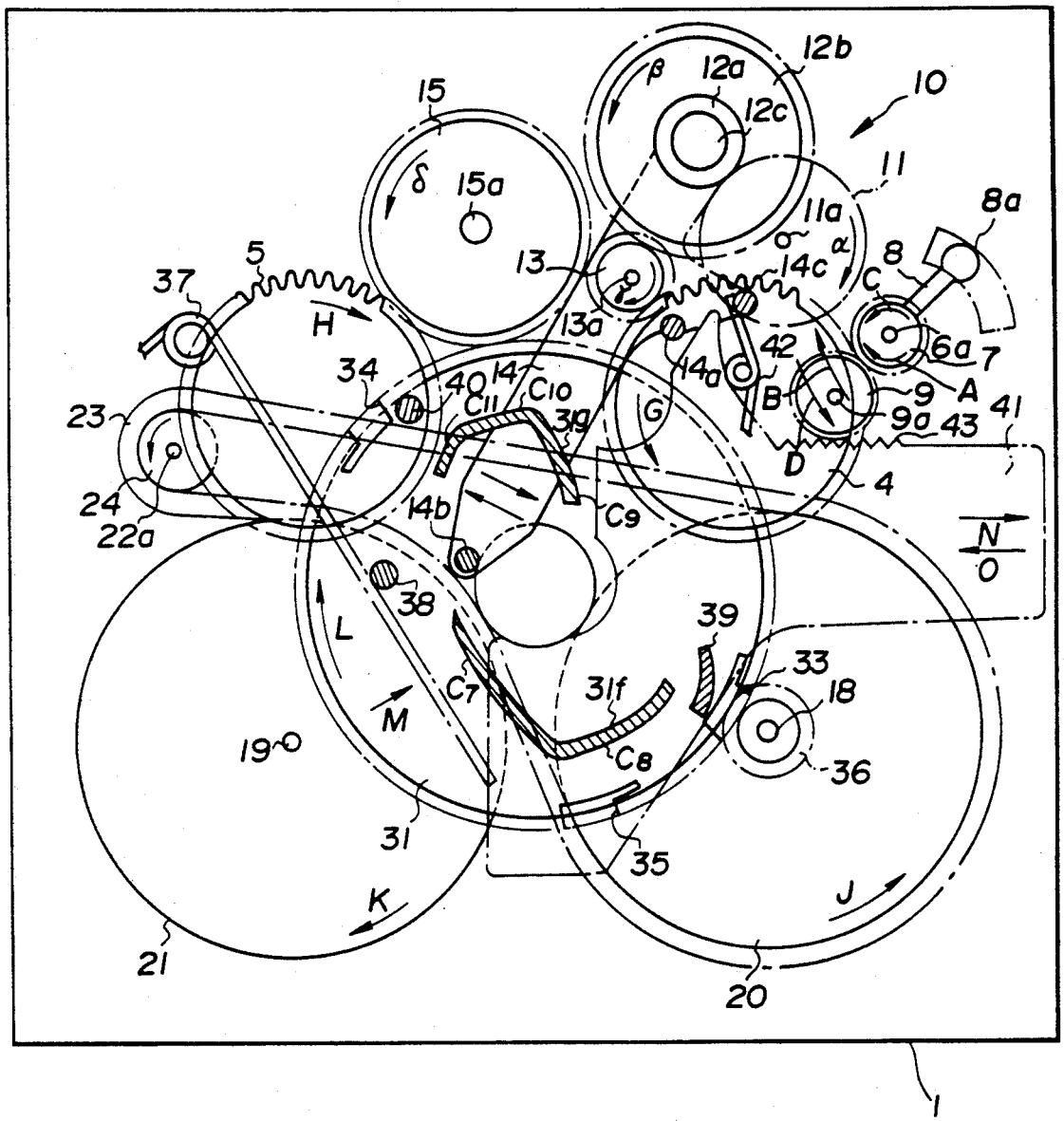
FIG. 9 is a plan view showing the arrangement of the recording and/or reproducing apparatus inclusive of the reverse surface side of the cam gear during the stop mode.

DESCRIPTION OF OUTLINE OF TAPE RECORDER CONSTRUCTION AND TAPE RUNNING MECHANISM (FIGS. 1, 2 and 9)

Referring to FIG. 1, signals can be recorded on or reproduced from a magnetic tape 105 placed around a pair of supply and take up tape reels 103, 104 rotatably supported within two cassette halves 102 of a tape cassette 101. Either reel can act as a supply or take up reel, depending upon the direction of tape travel.

This tape recorder is provided with two drive motors, i.e. a reel motor 6 for rotationally driving the tape reels 103, 104 and a capstan motor 22 for running the tape 105 at a constant speed, and with an operational mode switching mechanism driven by these two drive motors to effect selective switching from a variety of operational modes, as will be explained subsequently.

The tape cassette 101 is so constructed that the reel hubs 103a, 104a of the tape reels 103, 104 will face outwards via reel shaft insertion openings 106 formed in the upper and lower surfaces of the cassette half 102. The tape cassette 101 is also so constructed that a portion of the tape 105 extending between the tape reels 103, 104 will face outwards via a plurality of windows 107 formed in the front surface of the cassette half 102. In the upper and lower surfaces of the cassette half 102, a pair of capstan inserting openings 108, 108 are formed behind the magnetic tape 105 extending within the windows 107.

This tape recorder is provided with a chassis base plate 1 constituting a cassette attachment section for attaching to the cassette halves 102 of the tape cassette 101.

The chassis base plate 1 carries a pair of reel shafts 2, 3 projecting above the upper surface of the chassis base plate 1. These reel shafts 2, 3 are inserted into the cassette half 102 via reel shaft inserting openings 106, 106 so as to be inserted into and engaged with the reel hubs 103a, 104a of the tape reels 103, 104, respectively. The reel shafts 2, 3 are formed integrally with reel gears 4, 5 which are disposed on the upper surface of the chassis base plate 1. These reel gears 4, 5 are selectively rotated by the driving power of the reel motor 6 mounted on the underside of the chassis base plate 1 being transmitted via a reel shaft drive gearing 10.

Referring now to FIGS. 2 and 9, a drive shaft 6a of the reel motor 6 is fitted with a first transmission gear 7 and a swing arm 8. The first transmission gear 7 is mounted integrally on the drive shaft 6a of the reel motor 6 for synchronous rotation therewith. The swing arm 8 has its mid portion fulcrumed by the drive shaft 6a and is supported on the lower surface of the first drive gear 7 so as to be rotated with respect to the drive shaft 6a. On one side of the first transmission gear 7, a second transmission gear 9 meshing with the first transmission gear 7 is rotatably mounted by a supporting shaft 9a. Between the swing arm 8 and the first transmission gear 7, a friction member, not shown, is interposed for rotationally biasing the swing arm 8 by rotation of the first transmission gear 7. Depending on the rotational direction of the reel motor 6, the swing arm 8 is rotated about the fulcrum point on the drive shaft 6a as the center of rotation.

Hence, when the reel motor 6 is driven in the forward direction as shown by arrows A in FIGS. 2 and 9, the first transmission gear 7 is driven in the forward direction, while the swing arm 8 is driven in the forward direction, as indicated by arrows B in FIGS. 2 and 9, and the second transmission gear 9 is driven in the opposite direction to the direction of rotation of the first transmission gear 7. In this manner, when the swing arm 8 is driven in the above mentioned forward direction, the second transmission gear 9 meshes with a first intermediate gear 11 of the reel shaft drive gearing 10.

When the reel motor 6 is driven in the reverse direction as indicated by arrows C in FIGS. 2 and 9, with the swing arm 8 being driven in the reverse direction as indicated by arrows D in FIGS. 2 and 9, the second transmission gear 9 is shifted towards a cam gear retention slider 41 constituting an operational mode switching mechanism as later described. On the other end of the swing arm 8, a swing arm retention projection 8a is projected so as to be retained by a positioning projection, not shown, provided on the chassis base plate 1 for limiting the rotation of the swing arm 8 to a predetermined angular extent.

The reel shaft drive gearing 10 is constituted by the first intermediate gear 11, a second intermediate gear 12a meshing with the first intermediate gear 11, a third intermediate gear 12b coaxially, integrally mounted on the second intermediate gear 12a via a supporting shaft 12c, and a fourth intermediate gear 13 meshing with the third intermediate gear 12b. The first intermediate gear 11 is supported via supporting shaft 11a on the underside of the chassis base plate 1 for rotation with respect to the chassis base plate 1. The supporting shaft 12c mounting the second and the third intermediate gears 12a, 12b is rotatably supported on the chassis base plate 1. The second intermediate gear 12a is rotatably supported beneath the chassis base plate 1. The third intermediate gear 12b is rotatably supported above of the chassis base plate 1. The fourth intermediate gear 13 is rotatably fulcrumed and supported by a supporting shaft 13a erected at a mid portion of a forward/reverse changeover lever 14 constituting the operational mode switching mechanism as later described, and is positioned above the surface of the chassis base plate 1 via an inserting opening formed in the chassis base plate 1.

When the the reel motor 6 is driven in the forward direction, the intermediate gears 11, 12a, 12b and 13 are driven rotationally, with the second transmission gear 9 meshing with the first intermediate gear 11. Thus the gears 11, 12a, 12b, 13 are rotationally driven in the directions shown by arrows and in FIGS. 2 and 9.

The forward/reverse changeover lever 14 has its proximal end carried by the supporting shaft 12c, carrying the second intermediate gear 12a, and is thereby supported for rotation in the directions shown by arrows E and F in FIG. 2 with the supporting shaft 12c as the center of rotation. When the forward/reverse changeover lever 14 is rotationally driven by a cam gear 31 constituting the operational mode changeover mechanism, which will be described subsequently, the fourth intermediate gear 13 is moved along the perimeter of the third intermediate gear 12b, while the gear 13 remains engaged with the third intermediate gear 12b. That is, when the forward/reverse changeover lever 14 is rotated towards the forward side reel shaft 2, as indicated by arrows E in FIGS. 2 and 9, the fourth intermediate gear 13 meshes with the reel gear 4 of the forward side reel shaft 2. As indicated by arrows 6 in FIGS. 2 and 9, the forward side reel gear 4 is rotationally driven in the direction of taking up the magnetic tape 105 by the forward side tape reel 103 attached to the forward side reel shaft 2. When the forward/reverse changeover lever 14 is rotated towards the reverse side reel shaft 3, as indicated by arrows F in FIGS. 2 and 9, the fourth intermediate gear 13 meshes with an inverting gear 15 which is rotatably fulcrumed by a supporting shaft 15a mounted upright on the upper surface of the chassis base plate 1 and which meshes with reel gear 5 of the reverse side reel shaft 3. This causes the inverting gear 15 to be rotated in the direction opposite to the rotational direction of the fourth intermediate gear 13, as shown by arrows δ and γ in FIGS. 2 and 9. The reverse side reel gear 5 is rotationally driven in the direction opposite to the rotational direction of the forward side reel gear 4, that is in the direction of taking up the magnetic tape 105 by the reverse side tape reel 104 mounted on the reverse side reel shaft 3, as indicated by arrows H in FIGS. 2 and 9.

On the underside of the chassis base plate 1, a brake lever 16 is mounted for extending between the reel gears 4 and 5. This brake lever 16 has a pair of elongated openings 16c, 16d into which are inserted and supported a pair of slide guide shafts 16e, 16f mounted upright on the underside of the chassis base plate 1, so that the brake lever 16 is supported for reciprocation with respect to the chassis base plate 1 within the extent of the elongated openings 16c, 16d. This brake lever 16 is retained by one end of a brake lever biasing torsion coil spring 17 which has its coil section supported by a supporting shaft 17a mounted upright on the underside of the chassis base plate 1 and which has its other end retained by a retention pin 17b on the underside of the chassis base plate 1, so that the brake lever 16 is biased in the direction shown by an arrow I in FIG. 2. With the brake lever 16 thus biased, a pair of brake pawls 16a, 16b provided on both sides of the lever 16 and protruding above the upper surface of the chassis 1 via insertion openings therein are brought into abutment with the associated reel gears 4, 5 for braking these reel gears. The brake lever 16 can be moved in the direction of releasing the braking applied on the reel gears 4, 5 by the operational mode switching mechanism, which is to be explained subsequently.

Referring to FIG. 1, a pair of capstans 18, 19 on the forward and reverse sides of the tape travel are rotationally fulcrumed by the chassis base plate 1 so as to be introduced into capstan inserting openings 108 formed in the cassette half 102 and protrude above the upper surface of the chassis base plate 1. Referring to FIGS. 1 and 2, a pair of flywheels 20, 21 on the forward and reverse sides are mounted on the proximal ends of the capstans 18, 19 so as to lie on the underside of the chassis base plate 1. These flywheels 20, 21 are rotationally driven by the capstan motor 22 mounted on the underside of the chassis base plate 1. Thus the drive power of the capstan motor 22 is transmitted by a ring-like endless drive belt 23 placed between a drive pulley 24 mounted on a drive shaft 22a of the capstan motor 22 and the forward side flywheel 20. This endless drive belt 23 is engaged with the reverse side flywheel 21 on the outer side of a ring formed by the belt 23. Thus the flywheels 20, 21 are driven in opposite rotational directions to each other, as indicated by arrows J and K in FIG. 2.

A pair of pinch rolls 25, 26 on the forward and reverse sides of the tape travel are mounted on the upper surface of the chassis base plate 1 for facing the capstans 18, 19. The term "pinch rollers" is often used to describe what are described herein as "Pinch rolls."These pinch rolls 25, 26 are rotatably supported by means of pinch roll supporting shafts 28, 28, respectively, supported by a pair of pinch roll supporting arms 27, 27, respectively, in turn mounted on the chassis base plate 1.

The pinch roll supporting arms 27, 27 are rotatably supported by being fulcrumed at the proximal ends thereof by supporting shafts 27a, 27a mounted upright on the chassis base plate 1. The above mentioned pinch roll supporting shafts 28, 28 are mounted at the forward ends of the pinch roll supporting arms 27, 27, while separate pinch roll pressing torsion coil springs 27b are coiled about each supporting shaft 27a. Each end of each spring 27b is clampingly retained by a stop pin 27c projecting from the forward end of each supporting arm 27 towards the chassis base plate 1.

One of the pinch rolls 25 or 26 is selectively moved by the operational mode switching mechanism so as to be pressed on the associated capstans 18 or 19 with a predetermined thrust force afforded by the spring pressure of one of the springs 27b. Thus the pinch roll supporting arms 27, 27 are rotated by the operational mode switching mechanism under the thrust force afforded to the arms by the springs 27b, 27b. However, such rotation is limited by one of the pinch roll supporting arms 27, 27 being retained by either of the stop pins 27c when it engages one of the end stops 48b or 48c of the pinch roll selecting lever 48, as will be explained in greater detail further in this specification, so that one of the pinch rolls 25 or 26 is selected. The magnetic tape 105 is then clamped between the capstan 18 and the pinch roll 25 on the forward side or between the capstan 19 and the pinch roll 26 on the reverse side so as to travel in the forward or reverse direction, respectively. The magnetic tape 105 thus run is taken up on the forward side tape reel 103 or the reverse side tape reel 104.

On the chassis base plate 1, a magnetic head 29 is provided for facing the center of the central window 107 in the cassette 101 attached in position on the base plate 1. This magnetic head 29 is mounted for rotation with respect to a head supporting base plate 30 by means of a rotation supporting mechanism 29a actuated by the operational mode switching mechanism which will be described subsequently. The rotation supporting mechanism 29a rotates the magnetic head 29 through 180° in dependence upon the travelling direction of the magnetic tape 105.

The head supporting base plate 30 is mounted on the chassis base plate 1 for reciprocation thereon, by being supported by guides formed on the chassis base plate 1, so that the magnetic head 29 will be brought into or out of contact with the magnetic tape 105 travelling past the window 107. The head supporting base plate 30 is also retained by one end of a head supporting base plate biasing torsion coil spring 30c, which has its coil section supported by a supporting shaft 17a on the chassis base plate 1 and which has its other end retained by a retention pin 17b provided on the chassis base plate 1, in such a manner that the plate 30 is biased in the direction shown by the arrow P in FIG. 2 in which the magnetic tape 29 is spaced apart from the magnetic tape 105 travelling past the window 107.

The magnetic head 29 protrudes towards the magnetic tape 105 via head supporting base plate 30 by the operational mode switching mechanism as later described so as to be brought into sliding contact with the magnetic tape 105. The magnetic tape 105 is run in this state for recording and/or reproducing information signals on or from the magnetic tape 105.

EXPLANATION OF THE OPERATION MODE SWITCHING MECHANISM

(FIGS. 2 to 8, 11, 15 and 16)

The present tape recorder is provided with an operational mode switching mechanism functioning as a switching means between a plurality of operational modes.

The operational mode switching mechanism switches between a forward mode (FWD) for running the magnetic tape 105 in the forward direction for recording and/or reproduction, a reverse mode (REV) for running the magnetic tape 105 in the reverse direction for recording and/or reproduction, a fast feed (FF) mode for running the magnetic tape 105 at a higher speed in the forward direction, a rewind mode (RWD) for running the magnetic tape 105 at a higher speed in the reverse direction, a fast feed air selection mode (FFAMS) for running the magnetic tape 105 at higher speed in the forward direction, with the magnetic head 29 being in sliding contact with the magnetic tape 105, and a rewind air selecting mode (RWD-AMS) for running the magnetic tape 105 at higher speed in the reverse direction with the magnetic head 29 being in sliding contact with the magnetic tape 105. The term "music search" is often used to describe an operational mode described herein as "air selecting."

The operational mode switching mechanism includes the cam gear 31 which is rotatably supported by having a supporting shaft 31i fulcrumed by the chassis base plate 1, as shown in FIG. 2. This operational mode switching mechanism is mainly composed of the above mentioned head supporting base plate 30 which is moved as a function of the rotational angular position of the cam gear 31 for reciprocating the magnetic head 29 and the pinch rolls 29, 26, a pinch roll changeover lever 50 reciprocated by the cam gear 31 for selecting the pinch rolls 25, 26 which are caused to protrude by the head supporting base plate 30, the brake lever 16 and the forward/reverse changeover lever 14 which is rotated by the cam gear 31.

The cam gear 31 is formed as a disk having a peripheral gear section 32 which is formed with first to third interrupted sections 33, 34, 35 each extending for a predetermined angular extent. The front and rear surfaces of the cam gear 31 functioning as the one and the other major surfaces of the cam gear, are formed with protuberant cam surfaces, which will be explained subsequently.

A cam gear drive gear 36, mounted coaxially on the proximal end of the forward side capstan 18 meshes with the peripheral gear section 32 of the cam gear 31. When the capstan 18 is rotationally driven by the capstan motor 22, the cam gear 31 is driven into intermittent rotation in a predetermined direction as indicated by an arrow L in FIG. 2.

Thus the drive power transmission from the capstan motor 22 to the cam gear 31 is interrupted at a first rotational angular position with the cam gear drive gear 36 facing the first interrupted portion 33, at a second rotational angular position with the cam gear drive gear 36 facing the second interrupted portion 34 and at a third rotational angular position with the cam gear drive gear 36 facing the third interrupted section 35.

When the cam gear 31 is at one of the first to third rotational positions and thus the drive power transmission of the capstan motor 22 is interrupted, the cam gear 31 is rotationally biased in one direction by a trigger spring 37 acting as trigger means.

This trigger spring 37 is constituted by a torsion coil spring having its coil section supported by a supporting shaft 37a mounted upright on the chassis base plate 1 and also having its proximal end 37b retained by a retention pin 37d provided on the chassis base plate 1. When the cam gear 31 is at any one of the first to third rotational angular positions, the trigger spring 37 has its arm section 37c abuttingly engaged with one of first to third trigger spring retention projections 38 to 40 formed on the reverse surface of the cam gear 31 in association with the first to third interrupted portions 33 to 35, as shown in FIGS. 9, 12, 14, 17 and 18, for thrusting the trigger spring retention projections 38 to 40 in one direction as shown by an arrow M in FIG. 2.

The first trigger spring retention projection 38 is provided at a position such that, when the cam gear 31 is at the above mentioned first rotational angular position, the projection 38 abuts the arm section 37c of the trigger spring 37, as shown in FIG. 9, so that the cam gear 31 is rotationally biased in the predetermined direction as shown by an arrow L in FIG. 9 under the force of the trigger spring 37 by means of the first trigger spring retention projection 38.

Figure 12:
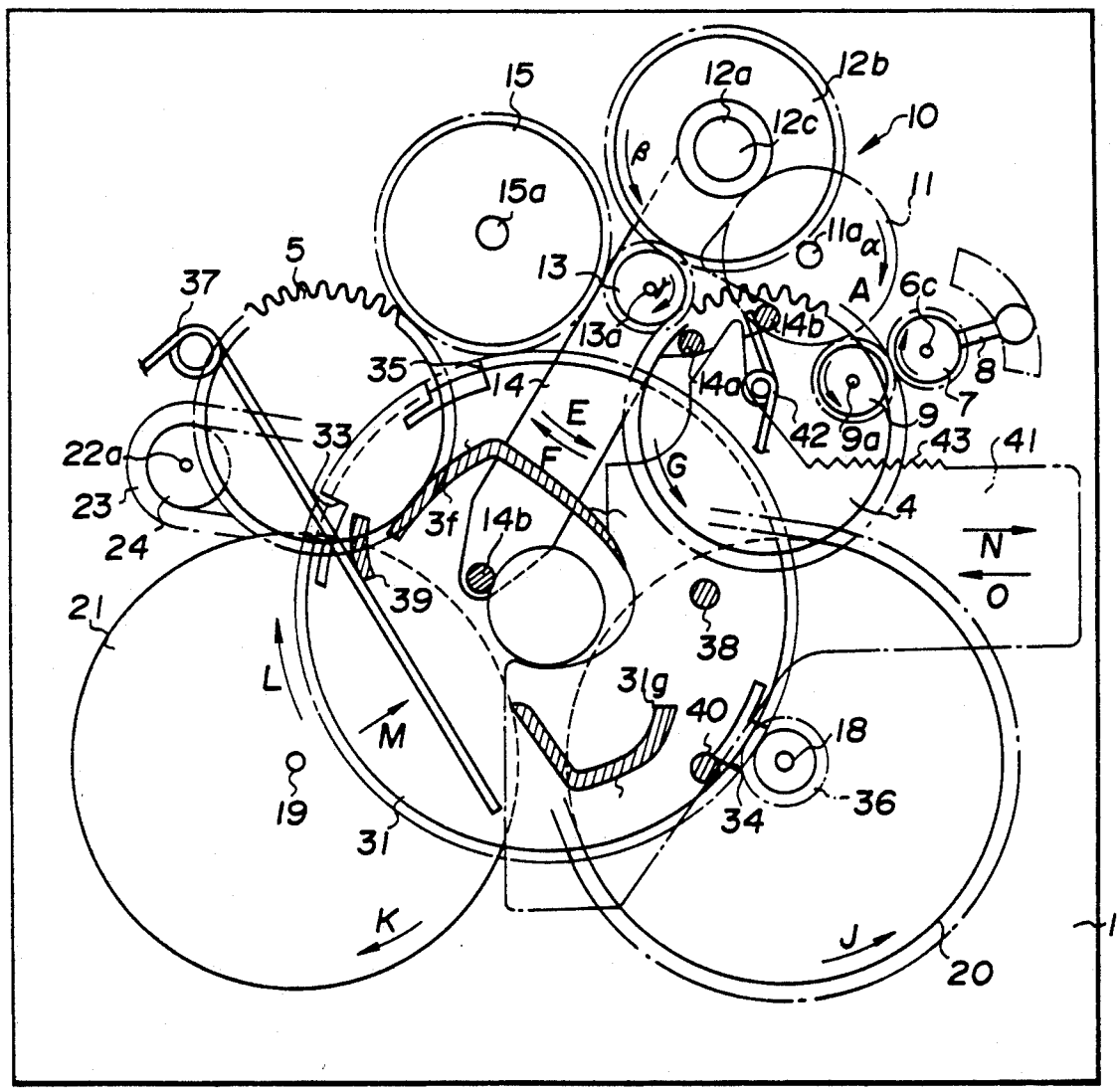
FIG. 12 is a plan view showing the arrangement of the recording and/or reproducing apparatus inclusive of the reverse surface side of the cam gear during the forward mode.
Figure 13:
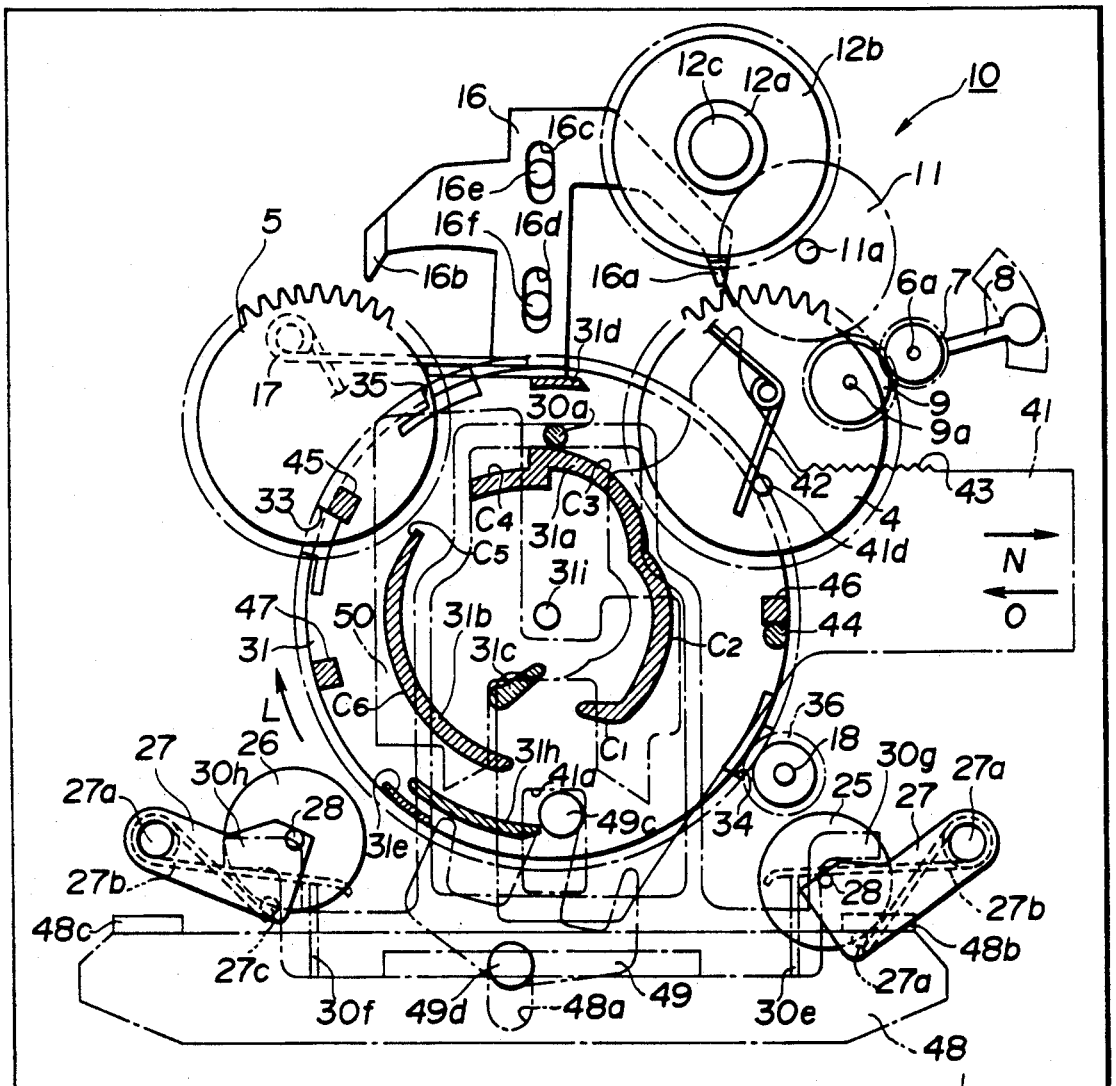
FIG. 13 is a plan view showing the arrangement of the recording and/or reproducing apparatus inclusive of the front surface side of the cam gear during the reverse mode.
Figure 14:
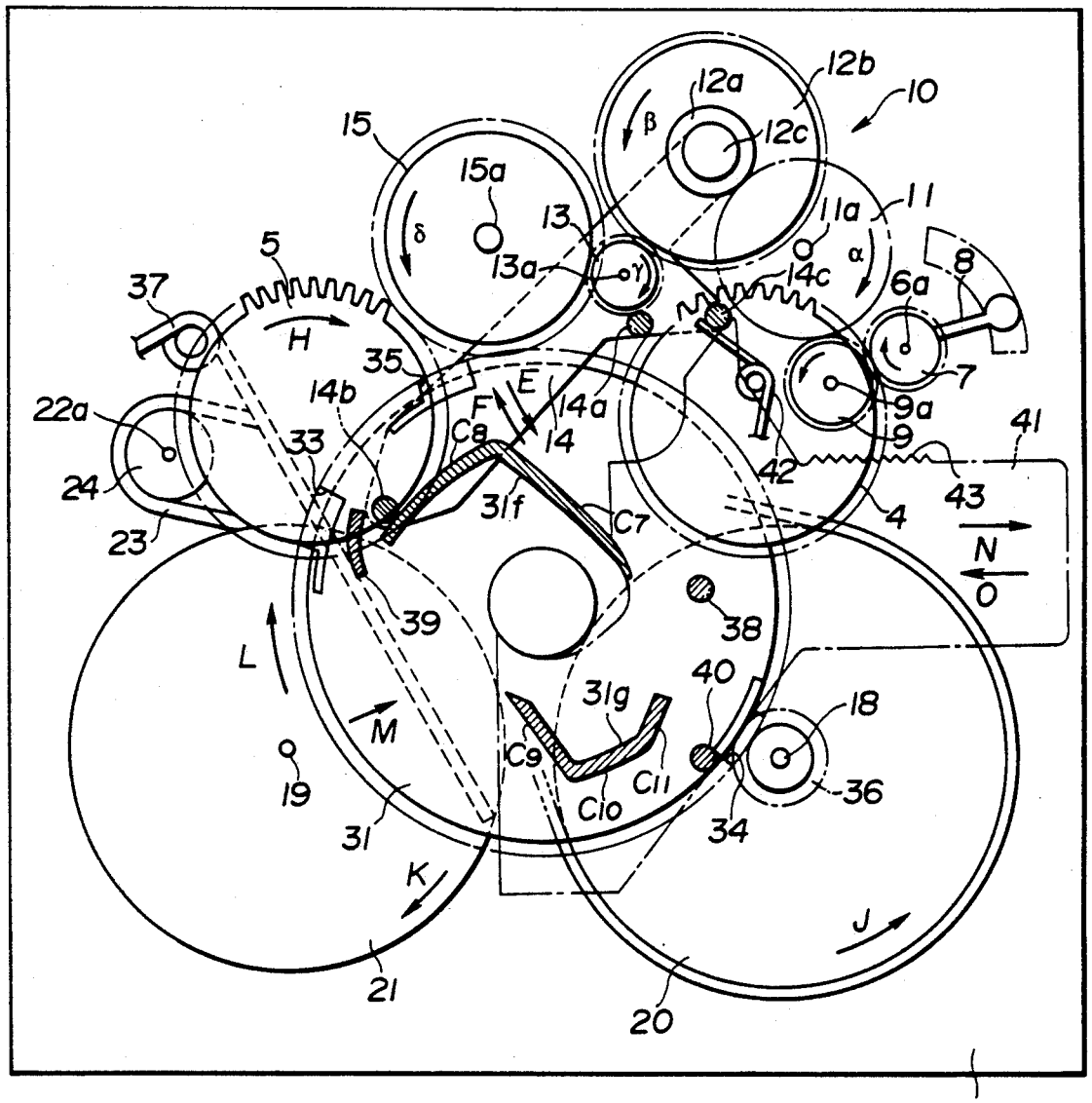
FIG. 14 is a plan view showing the arrangement of the recording and/or reproducing apparatus inclusive of the reverse surface of the cam gear during the reverse mode.

The second trigger spring retention projection 39 is provided at a position such that, when the cam gear 31 is at the above mentioned second rotational angular position, the projection 39 abuts the arm section 37c of the trigger spring 37, as shown in FIGS. 12 to 14, so that the cam gear 31 is rotationally biased in the predetermined direction as shown by an arrow L in FIGS. 12 to 14 under the force of the trigger spring 37 by means of the second trigger spring retention projection 39.

Figure 17:
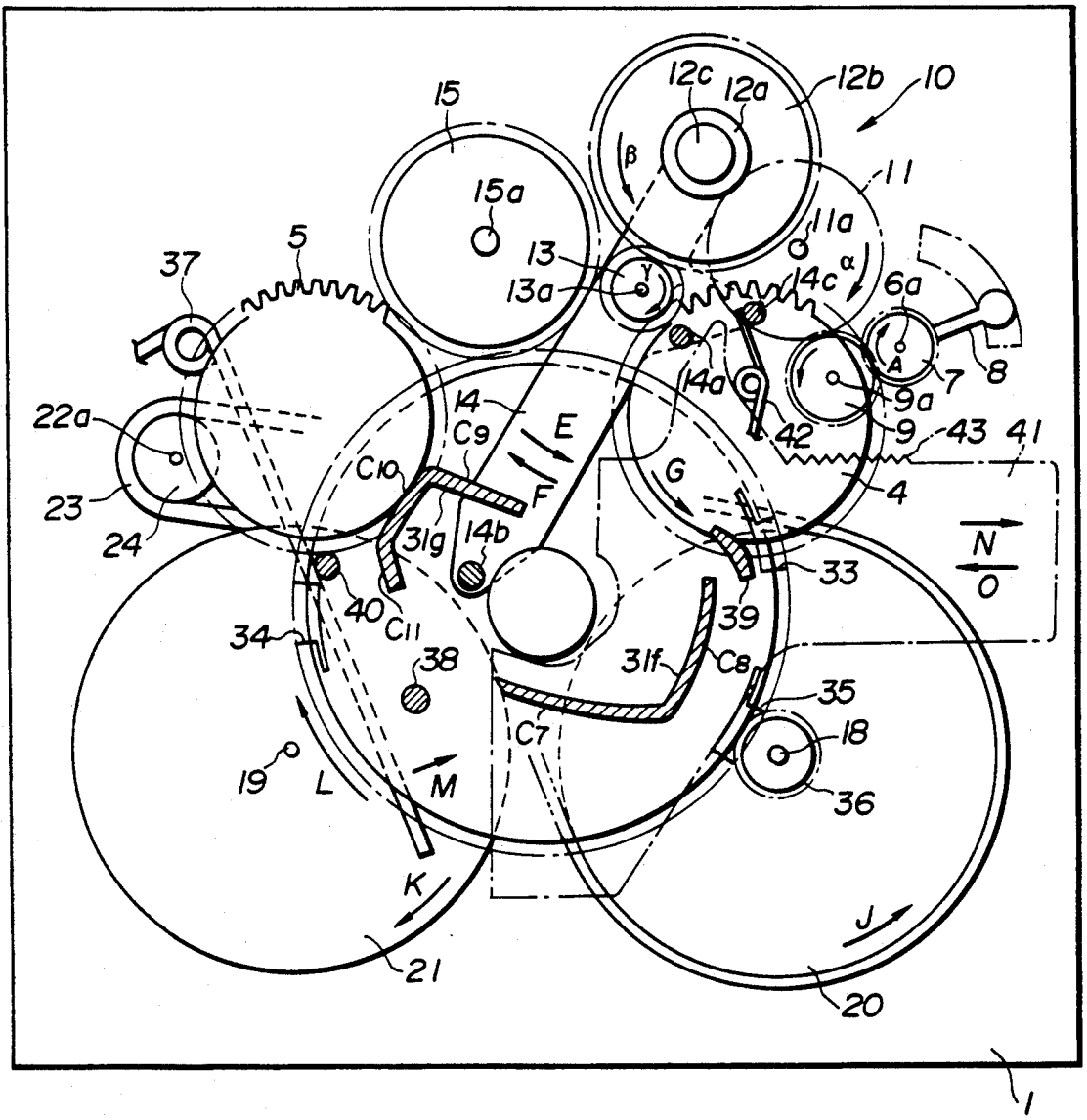
FIG. 17 is a plan view showing the arrangement of the recording and/or reproducing apparatus inclusive of the rear surface side of the cam gear during the fast feed mode or the fast feed air selecting mode. The term "music search" is often used to describe to operational mode described herein as "air selecting."
Figure 18:
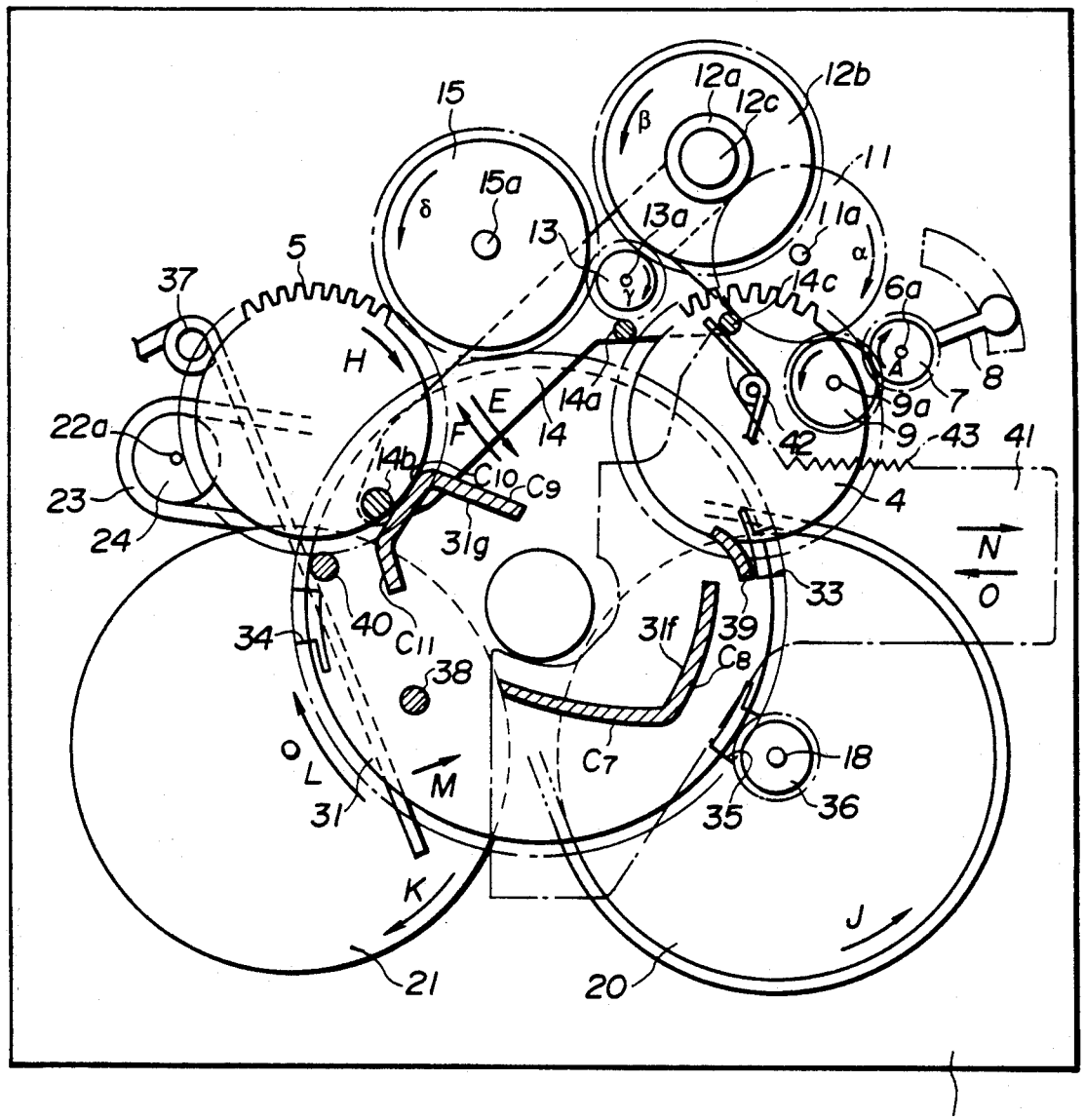
FIG. 18 is a plan view showing the arrangement of the recording and/or reproducing apparatus during the rewind mode or during the rewind air selecting mode.

The third trigger spring retention projection 40 is provided at a position such that, when the cam gear 31 is at the above mentioned third rotational angular position, the projection 40 abuts on the arm section 37c of the trigger spring 37, as shown in FIGS. 17 and 18, so that the cam gear 31 is rotationally biased in the predetermined direction as shown by an arrow L in FIGS. 17 and 18 under the force of the trigger spring 37 by means of the third trigger spring retention projection 40.

In this manner, the cam gear 31 is rotationally biased by the trigger spring 37 in the same direction as that in which it is rotationally biased by the capstan motor 22 by means of the cam gear cam gear drive gear 36.

A cam gear retention slider 41 functioning as the cam gear retention member, is provided for facing the front surface of the cam gear 31. This cam gear retention slider 41 is formed to extend from near the reel motor 6 to near the magnetic head 29, by way of the vicinity of the forward side reel gear, and is formed with an elongated opening in the vicinity of the reel motor 6. The cam gear retention slider 41 is supported for reciprocation with a slider supporting projection 41b mounted upright on the chassis base plate 1 being introduced through and guided within the elongated opening 41c. This cam gear retention slider 41 is biased in a direction away from the cam gear 31, as indicated by an arrow N in FIG. 2, by one arm section 42c of a retention slider biasing torsion coil spring 42 being retained by a retention projection 41d provided on the cam gear retention slider 41. The retention slider biasing torsion coil spring 42 has its coil section supported by a supporting shaft 42a mounted upright on the chassis base plate 1 and has its other arm section 42b retained by an engaging pin 14c mounted upright at a mid portion of the forward-/reverse changeover lever 14.

When the reel motor 6 is driven in the reverse direction as indicated by an arrow C in FIG. 2, the swing arm 8 is rotated towards the cam gear retention slider 41, with the second transmission gear 9 meshing with a slider actuating gear 43 formed on an edge of the cam gear retention slider 41. As the drive force of the reel motor 6, driven in the reverse direction, is transmitted to the slider actuating gear 43 by way of the first and second transmission gears 7, 9, the cam gear retention slider 41 is moved in the direction shown by an arrow 0 in FIG. 2, against the bias of the spring 42.

A cam gear retention projection 44, functioning as a retainer, is formed on the surface of the cam gear retention slider 41 facing the front surface of the cam gear 31. When the reel motor 6 is not driven in the reverse direction and the cam gear retention slider 41 is at an initial position, the cam gear retention projection 44 is abuttingly engaged with one of first to third concentric retained projections 45, 46, 47 formed on the surface of the cam gear 31 with predetermined angular intervals in association with the first to third interrupted portions 33, 34, 35 for inhibiting the rotation of the cam gear 31. When the cam gear retention projection 44 is abuttingly engaged in this manner with one of the first to third retained projections 45 to 47, the cam gear 31 is at one of the above mentioned first to third rotational angular positions.

In this manner, when the cam gear 31 is at the above mentioned first rotational angular position, the first retained projection 45 abuts on the cam gear retention projection 44 of the cam gear retention slider 41, which is at the initial position, for halting the cam gear 31 against the rotational bias imparted from the trigger spring 37.

Likewise, when the cam gear 31 is at the above mentioned second rotational angular position, the second retained projection 46 abuts on the cam gear retention projection 44 of the cam gear retention slider 41, which is at the initial position, for halting the cam gear 31 against the rotational bias imparted from the trigger spring 37.

Likewise, when the cam gear 31 is at the above mentioned third rotational angular position, the third retained projection 47 abuts on the cam gear retention projection 44 of the cam gear retention slider 41, which is at the initial position, for halting the cam gear 31 against the rotational bias imparted from the trigger spring 37.

When the reel motor 6 is driven in the reverse direction, the cam gear retention slider 41 is moved against the bias of the retention slider biasing spring 42 for disengaging the cam gear retention projection 44 from one of the first to third retained projections 45 to 47 to permit rotation of the cam gear 31. The cam gear 31 is allowed to be rotated a small angle under the bias of the trigger spring 37, the cam gear cam gear drive gear 36 then meshing with the gear section 32 to maintain the rotational operation.

That is, when the reel motor 6 is driven in the reverse direction, retention of rotation of the cam gear 31 is released to permit rotation of the cam gear 31. When the driving of the reel motor 6 in the reverse direction is discontinued, the cam gear retention slider 41 is reset to its initial position, with the cam gear 31 being retained at one of the above mentioned first to third rotational angular positions.

When the head supporting base plate 30 is moved in the direction shown by an arrow Q in FIG. 2, against the bias of the head supporting base plate biasing spring 30c, the magnetic head 29 is advanced into sliding contact with the magnetic tape 105 of the tape cassette 101. Simultaneously, one end of each of the pinch roll thrusting springs 27b, 27b is thrust against by each of the pinch roll actuating pieces 30e, 30f, respectively, provided on both sides of the base plate 30, causing the pinch roll supporting arms 27, 27 to pivot due to the other ends of these pinch roll thrust springs 27b, 27b.

Meanwhile, when the head supporting base plate 30 is set to the initial position under the bias of the head supporting base plate biasing spring 30c, rotation of the pinch roll supporting arms 27, 27 is regulated by means of the pinch roll stop sections 30g, 30h provided on both ends of the base plate 30 and also by means of the stop pins 27c, 27c.

A head shifting pin 30a is mounted upright on the side of the head supporting base plate 30 facing the surface of the cam gear 31. The head supporting base plate 30 can also be moved in the direction indicated by an arrow Q in FIG. 2, in dependence upon the selected operational mode, as will be described subsequently, by the head shifting pin 30a being guided by first and second head supporting base plate shifting, cam surfaces 31a, 31b projecting from the surface of the cam gear 31.

Figure 8:
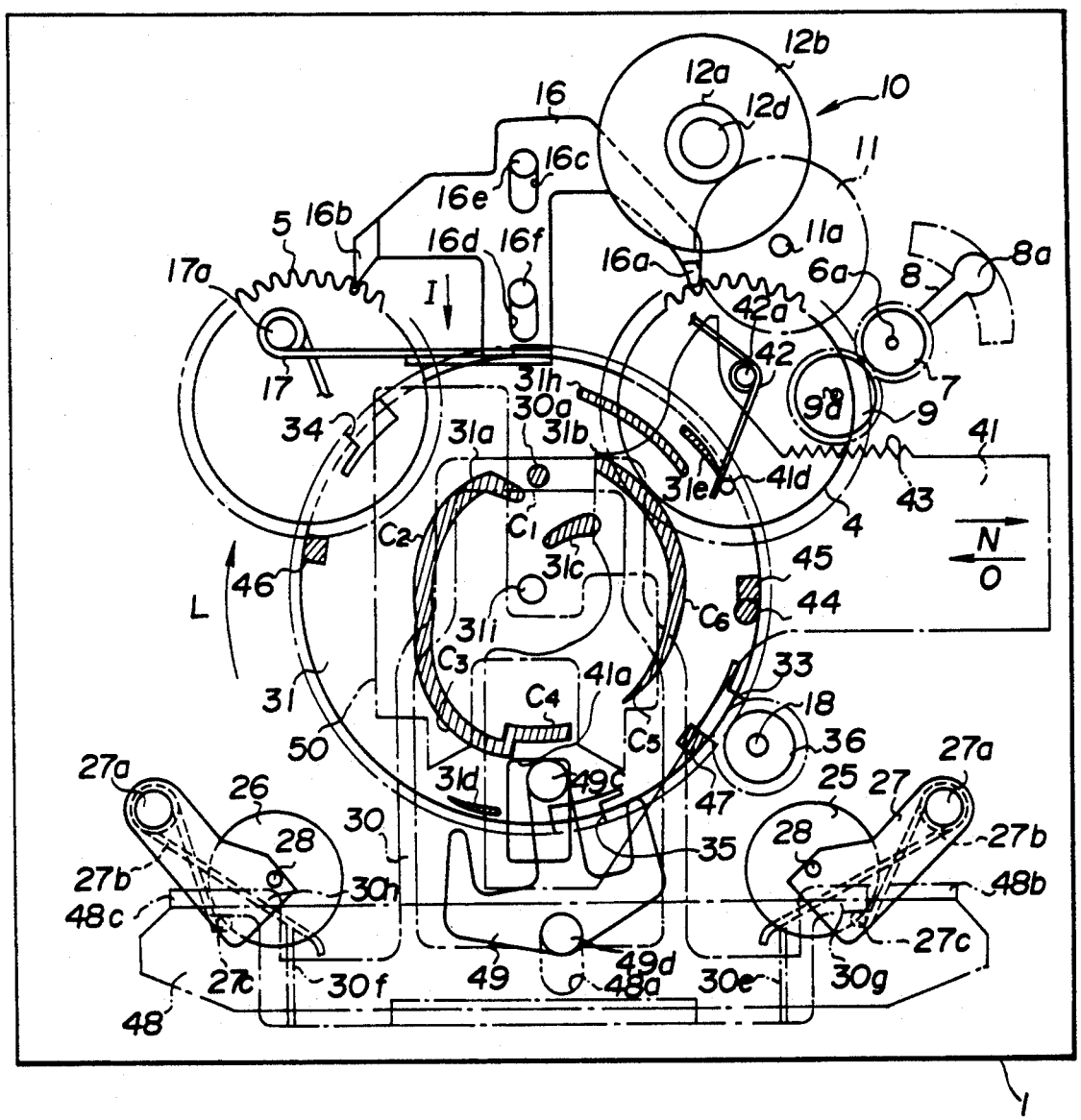
FIG. 8 is a plan view showing the arrangement of the recording and/or reproducing apparatus inclusive of the front surface side of the cam gear during the stop mode.

Referring to FIG. 8, the first head supporting base plate shifting, cam surface 31a has an inclined guide cam surface $c_1$ which abuts on the head shifting pin 30a to shift the head shifting pin 30a towards the outer periphery of the cam gear 31 when the cam gear 31 starts to be rotated in a predetermined direction from the above mentioned first rotational angular position. The cam surface 31a also has a guide cam section $c_2$ which is concentric with the gear section 32 and which is continuous with the inclined guide cam section $c_1$. The guide cam section $c_2$ functions, when the cam gear 31 is rotated further, to stop the head shifting pin 30a at a position to which it has been moved by the inclined guide cam section $c_1$.

Figure 11:
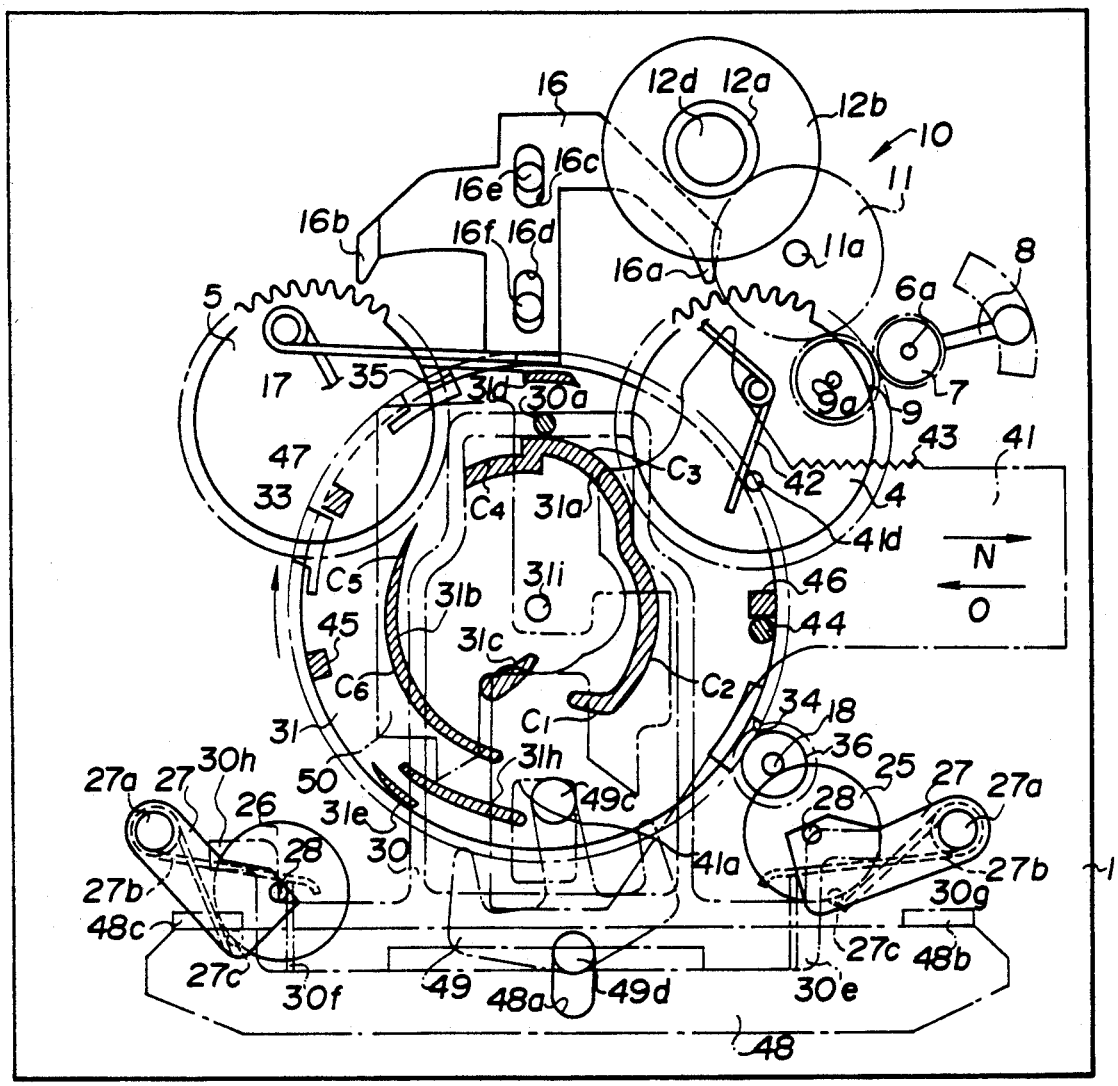
FIG. 11 is a plan view showing the arrangement of the recording and/or reproducing apparatus inclusive of the front surface side of the cam gear during the forward mode.

The cam surface 31a also has an inclined cam section $c_3$ which is continuous to the concentric guide cam section $c_2$ and which functions to shift the head shifting pin 30a further towards the outer periphery of the cam gear 31 upon further rotation of the cam gear 31 in the predetermined direction. As shown in FIGS. 11 to 13, the inclined cam section $c_3$ is contoured to shift the head shifting pin 30a so that, when the cam gear 31 reaches the above mentioned second rotational angular position, as shown in FIGS. 11 and 13, the magnetic head 29 is at a predetermined position such that the magnetic head 29 is brought into sliding contact with the magnetic tape 105 to perform recording and/or reproduction of information signals.

The first head supporting base plate shifting, cam surface 31a also has a horizontal guide cam section $c_4$ which is contiguous to the inclined cam section $c_3$ with the interposition of a step and which halts the head shifting pin 30a at a position approximately equal to the position in which the pin 30a is retained by the concentric guide cam section $c_2$. Thus the cam section $c_2$ is designed to be concentric with the horizontal guide cam section $c_4$.

Figure 19:
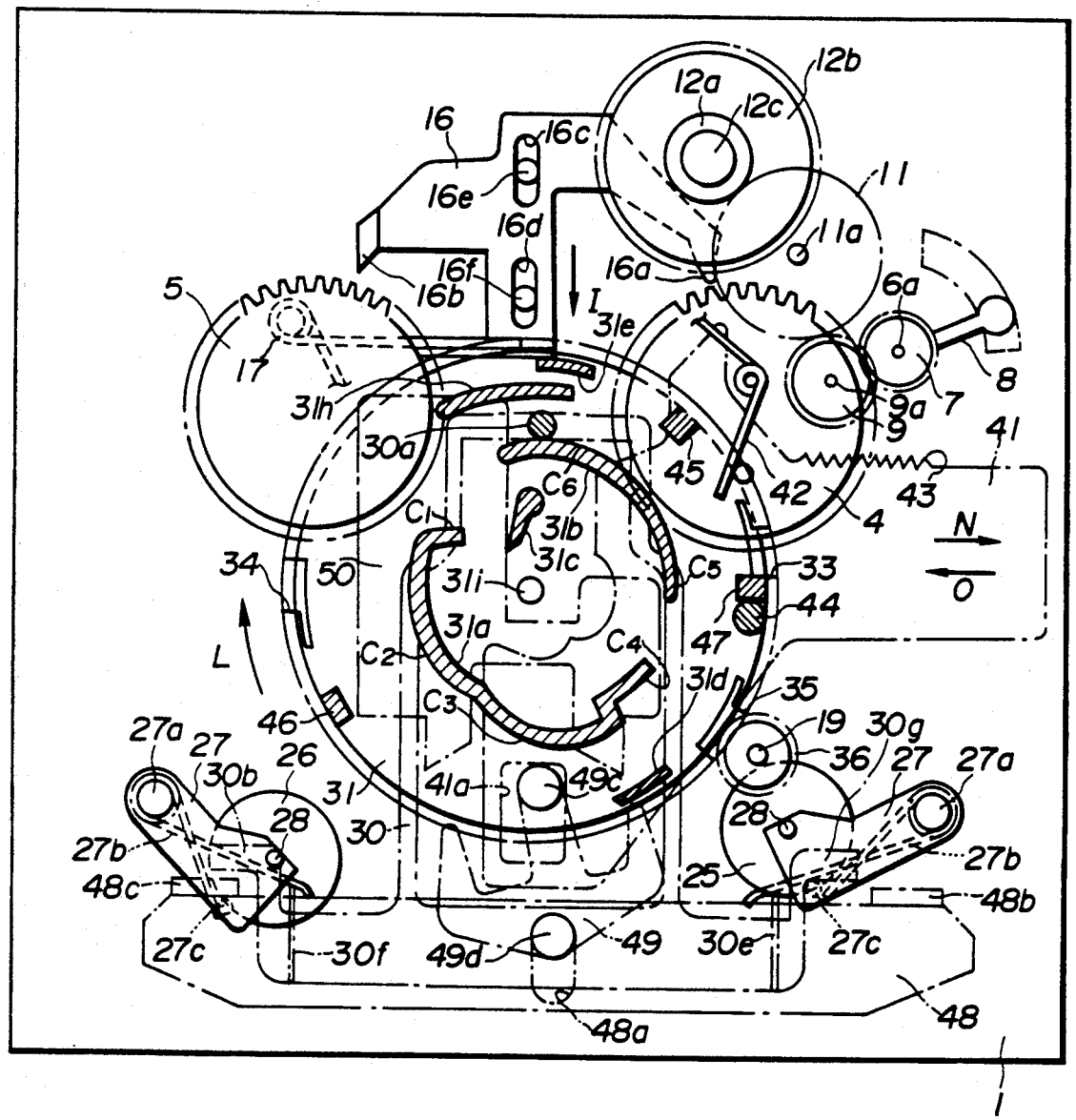
FIG. 19 is a plan view showing the arrangement of the recording and/or reproducing apparatus inclusive of the front surface of the cam gear during the fast feed air selecting or the rewind air selecting mode switched from the forward mode.
Figure 20:
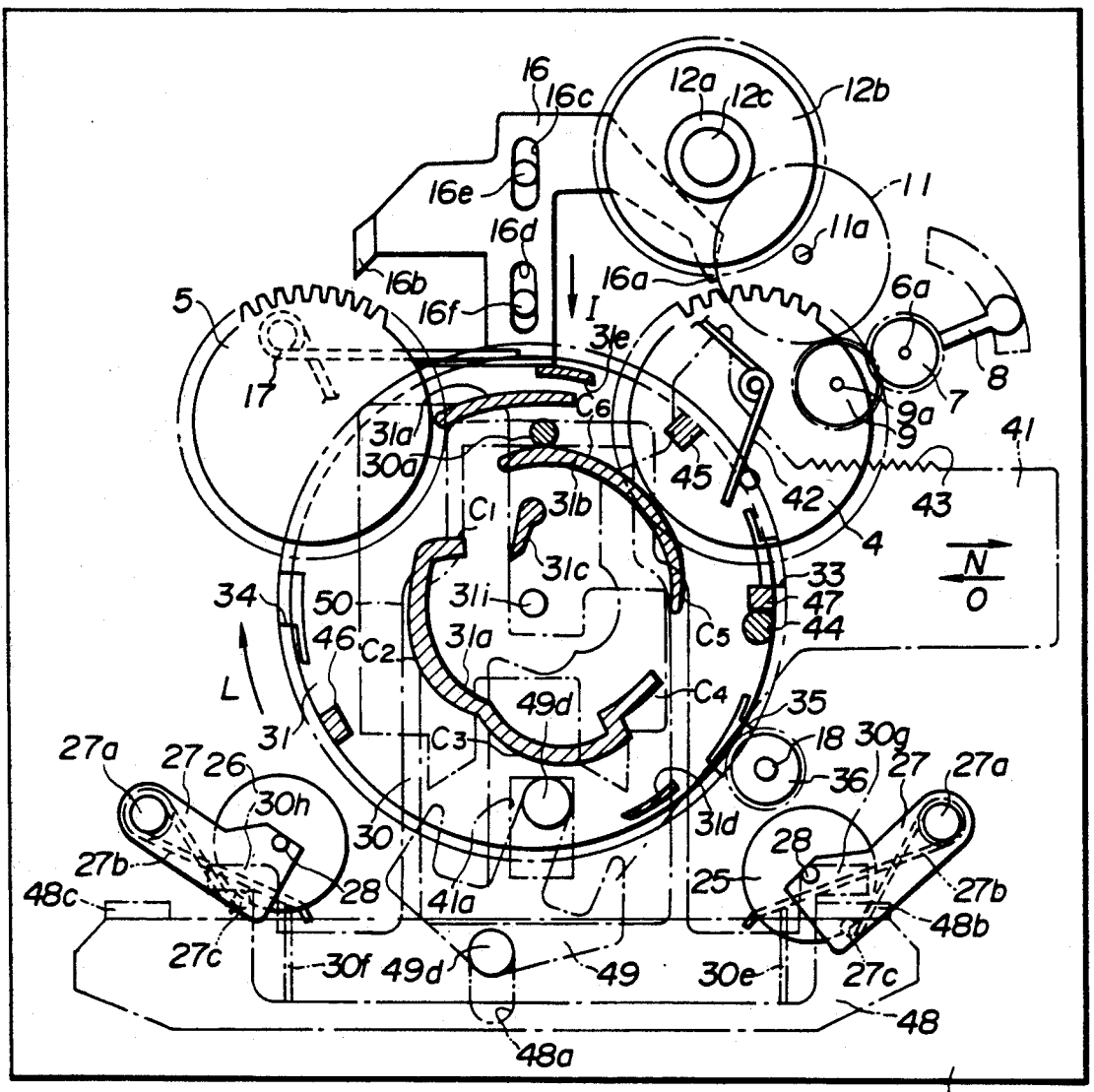
FIG. 20 is a plan view showing the arrangement of the recording and/or reproducing apparatus inclusive of the front surface side of the cam gear during the fast feed air selecting mode or the rewind air selecting mode switched from the reverse mode.

Referring to FIG. 8, the second head supporting base plate shifting, cam surface 31b is formed at a position spaced a predetermined angle from the first head supporting base plate shifting, cam surface 31a. This second head supporting base plate shifting, cam surface 31b has a guide cam section $c_5$ of a somewhat reduced thickness, such that, when the cam gear 31 is rotated in a predetermined direction from the above mentioned second rotational angular position, the head shifting pin 30a is smoothly guided onto the inner or outer peripheral sides of the second head supporting base plate shifting, cam surface 31b. This guide cam section $c_5$ is substantially concentric with the above mentioned concentric guide cam section $c_2$. The second head supporting base plate shifting, cam surface 31b also has a head supporting cam section $c_6$ which is contiguous to the guide cam section $c_5$ and which is concentric with the guide cam section $c_2$ over a predetermined angular extent. This head supporting cam section $c_6$ operates in such a manner that, when the cam gear 31 is at the third rotational angular position as shown in FIGS. 19 and 20, and when the air selection mode as later described is established, the magnetic head 29 is moved at such a speed that information signals recorded on the magnetic tape 105 running at a higher speed can be read only barely.

On the underside of the chassis base plate 1, a pinch roll selecting lever 48 is provided for extending between the proximal ends of supporting shafts 27a, 27a supporting the pinch roll supporting arms 27, 27. The pinch roll selecting lever 48 has elongated openings 48d, 48e, into which a pair of supporting projections 48f, 48g formed on the underside of the chassis base plate 1 are introduced and guided, so that the lever 48 is supported for movement in a direction of bridging the proximal ends of the supporting shafts 27a, 27a, as shown by an arrow R in FIG. 2.

The pinch roll selecting lever 48 is formed with a pair of pinch roll controlling end projections 48b, 48c, which protrude above the upper surface of the chassis base plate 1 through a pair of through-holes 48i, 48j formed in the chassis base plate 1. These pinch roll control projections 48b, 48c are so designed that, with the pinch roll selecting lever 48 being positioned on one or the other side between the proximal ends of the supporting shafts 27a, 27a, one of the pinch roll control projections 48b, 48c is brought into facing engagement with the corresponding side stop pin 27c of the pinch roll supporting arm 27. That is, the pinch roll selecting lever 48 is so designed that, when the head supporting base plate 30 is moved to cause rotation of the pinch roll supporting arms 27, 27, one of the pinch roll control projections 48b, 48c is abuttingly engaged with an associated one of the stop pins 27c, 27c to restrict the rotation of associated one of the pinch roll supporting arms 27, 27. In this manner, by restricting rotation of one of the pinch roll supporting arms 27, 27, only that one of the pinch rolls 25 or 26 which is supported by the pinch roll supporting arm 27 whose rotation is not restricted is selectively brought into abutting contact with an associated one of the capstans 18 or 19.

The pinch roll selecting lever 48 when moved from one to the other side between the proximal ends of the supporting shafts 27a, 27a causes a rotation through about 180° of the magnetic head 29 through the rotation supporting mechanism 29a for associating the magnetic head 29 with the track of the running direction of the magnetic tape 105.

The pinch roll selecting lever 48 is moved towards one or the other side of a line interconnecting the proximal ends of the supporting shafts 27a, 29a by the cam gear retention slider 41 and the cam gear 31.

That is, a selection lever, actuating lever 49 is provided between the cam gear retention slider 41 and the pinch roll selecting lever 48. This selection lever, actuating lever 49 has an end engaging pin 49c rotatably engaging in an engaging opening 41a formed in one end of the cam gear retention slider 41. The selection lever, actuating lever 49 also has a proximal engaging pin 49d rotatably engaging in an engaging groove 48a formed at the center of the pinch roll selecting lever 48. The selection lever, actuating lever 49 is also supported by a bent supporting piece 48h formed at the center of the pinch roll selecting lever 48 for facing the engaging groove 48a, so that the engaging pin 49d is prevented from descending from the engaging groove 48a. The actuating lever 49 is provided on both of its sides with first and second paired actuating arm sections 49a, 49b.

The above mentioned pinch roll switching lever 50 is provided for facing both the front surface of the cam gear 31 and the pair of actuating arm sections 49a, 49b. The changeover lever 50 is supported for reciprocation with respect to the chassis base plate 1 by a pair of supporting pieces 50a introduced into a pair of elongate openings 50b formed in the chassis base plate 1. The pinch roll changeover lever 50 is biased in a direction away from the actuating arm sections 49a, 49b with an arm section of a selecting lever, biasing spring 50d being retained by a retainer 50f. The spring 50d is a torsion coil spring having its coil section supported by a supporting pin 50c mounted upright on the chassis base plate 1 and having its proximal end retained by a retention pin 50e mounted upright on the chassis base plate 1. The sides of the pinch roll changeover lever 50 facing the actuating arm sections 49a, 49b are formed as inwardly inclined first and second surfaces 50g, 50h. When the cam gear 31 is rotated from the first rotational angular position towards the second rotational angular position, the pinch roll changeover lever 50 is shifted towards the actuating arm sections 49a, 49b, against the bias of the selecting lever, biasing spring 50d, as shown by an arrow 5 in FIG. 2, by a pinch roll switching cam surface 31c which projects from the surface of the cam gear 31.

As shown in FIGS. 8 and 11, the pinch roll switching cam surface 31c is formed more inwardly than the first and second head supporting base plate shifting, cam surfaces 31a, 31b. This pinch roll switching cam surface 31c is so arranged that, when the cam gear is rotated from the first rotational angular position to the second rotational angular position, the cam surface 31c is brought into abutting engagement with the pinch roll switching lever 50 to shift the lever 50 towards the actuating arm sections 49a, 49b.

Figure 3:
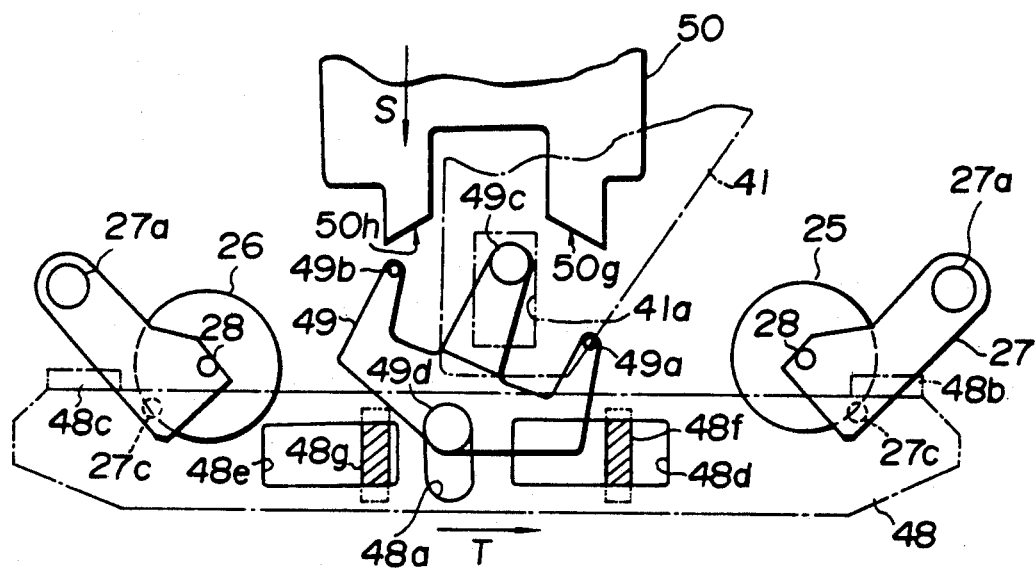
FIG. 3 is a plan view showing the state of forward side selection of the pinch roll selecting mechanism of the recording and/or reproducing apparatus.
Figure 4:
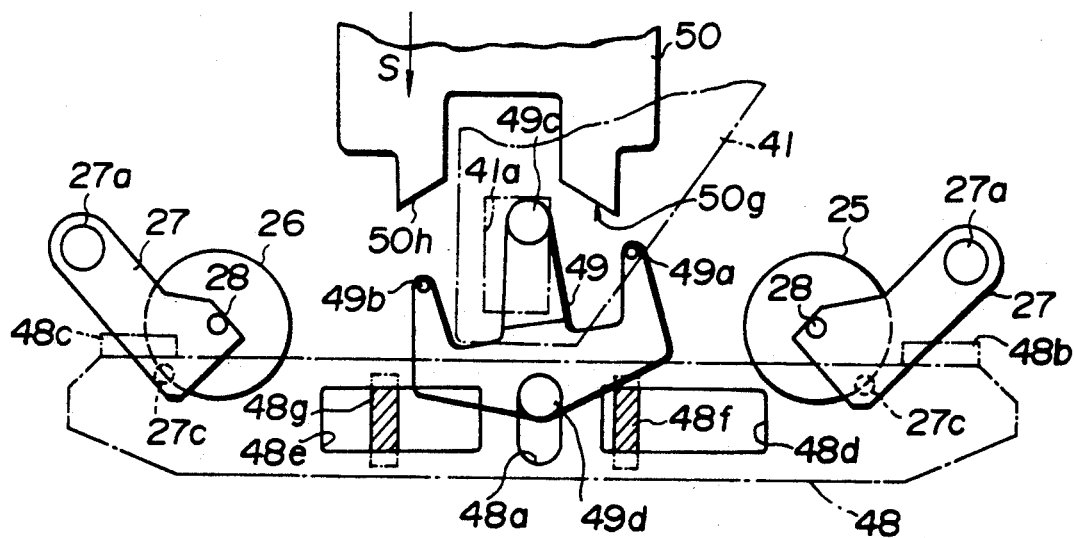
FIG. 4 is a plan view showing the state of maintaining of the forward side in the pinch roll selecting mechanism of the recording and/or reproducing apparatus.

It is now assumed that, when the pinch roll changeover lever 50 is shifted in the above described manner, the cam gear retention slider 41 is not shifted towards the cam gear 31, as shown in FIG. 3, while the pinch roll selecting lever 48 is positioned towards the reverse side pinch roll 26. In such case, the second actuating arm section 49b is thrust by the second inclined surface 50h of the pinch roll switching lever 50 to rotate the selecting lever, actuating lever 49 to shift the pinch roll selecting lever 48 towards the forward side pinch roll 25, as shown by an arrow T in FIG. 3.

Next, it is assumed that, when the pinch roll switching lever 50 is shifted by the cam gear 31 towards the actuating arm sections 49a, 49b, the cam gear retention slider 41 is not shifted towards the cam gear 31, while the pinch roll selecting lever 48 is positioned towards the forward side pinch roll 25. In such case, the actuating arm sections 49a, 49b are not in abutment on the inclined surfaces 50g, 50h of the pinch roll switching lever 50, while the pinch roll selecting lever 48 is not shifted. In short, if the cam gear retention slider 41 is not shifted towards the cam gear 31 when the pinch roll switching lever 50 is shifted by cam gear 31, the pinch roll selecting lever 48 is necessarily positioned towards the forward side pinch roll 25. The pinch roll selecting lever 48 then restricts the rotation of the reverse side pinch roll supporting arm 27, while allowing the forward side pinch roll supporting arm 27 to rotate freely.

Figure 5:
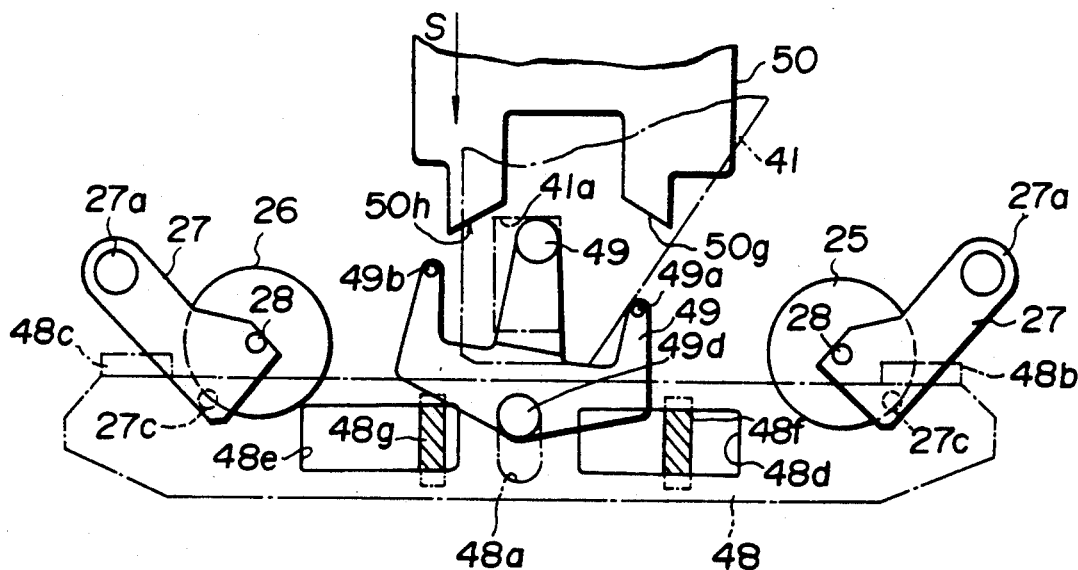
FIG. 5 is a plan view showing the state of maintaining of the reverse side in the pinch roll selecting mechanism of the recording and/or reproducing apparatus.

It is then assumed that, when the pinch roll switching lever 50 is shifted by the cam gear 31 towards the actuating arm sections 49a, 49b, the cam gear retention slider 41 is shifted towards the cam gear 31, as shown in FIG. 5, while the pinch roll selecting lever 48 is positioned towards the reverse pinch roll 26. In such case, the actuating arm sections 49a, 49b are not in abutment with the inclined surfaces 50g, 50h of the pinch roll switching lever 50, while the pinch roll selecting lever 48 is not shifted.

Figure 6:
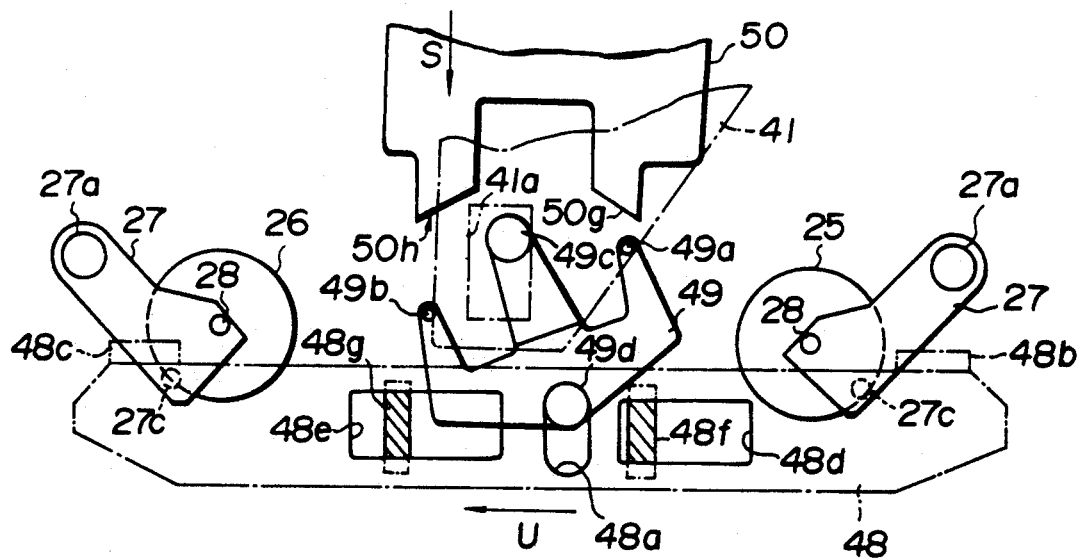
FIG. 6 is a plan view showing the state of selection of the reverse side in the pinch roll selecting mechanism of the recording and/or reproducing apparatus.

Finally, it is assumed that, when the pinch roll switching lever 50 is shifted by the cam gear 31, the cam gear retention slider 41 is shifted towards the cam gear 31, as shown in FIG. 6, with the pinch roll selecting lever 48 being positioned towards the forward side pinch roll 25. In such case, the first actuating arm section 49a is thrust by the first inclined surface 50g of the pinch roll switching lever 50, the selecting lever actuating lever 49 being thus rotated to shift the pinch roll selecting lever 48 towards the reverse side pinch roll 26, as shown by an arrow U in FIG. 6. In short, if the cam gear retention slider 41 is shifted towards cam gear 31 when the pinch roll switching lever 50 is shifted towards cam gear 31, the pinch roll selecting lever 48 is necessarily positioned towards the reverse side pinch roll 26. The pinch roll selecting lever 48 then restricts the rotation of the forward side pinch roll supporting arm 27, while allowing the reverse side pinch roll supporting arm 27 to rotate freely.

The brake lever 16 is shifted by first and second braking cam surfaces 31a, 31e protuberantly formed on the surface of the cam gear 31, against the bias of the brake lever biasing spring 17, depending upon the selected operational mode, as will be explained subsequently, for releasing the braking applied to the reel gears 4, 5.

As shown in FIGS. 11 and 13, the first braking cam surface 31d is formed at a position closer to the outer periphery of the cam gear 31 than the head supporting base plate shifting, cam surfaces 31a, 31b, so that, when the cam gear 31 is at the above mentioned second rotational angular position, the cam surface 31d abuts on the brake lever 16 to shift the brake lever 16 in a direction away from the cam gear 31.

Figure 15:
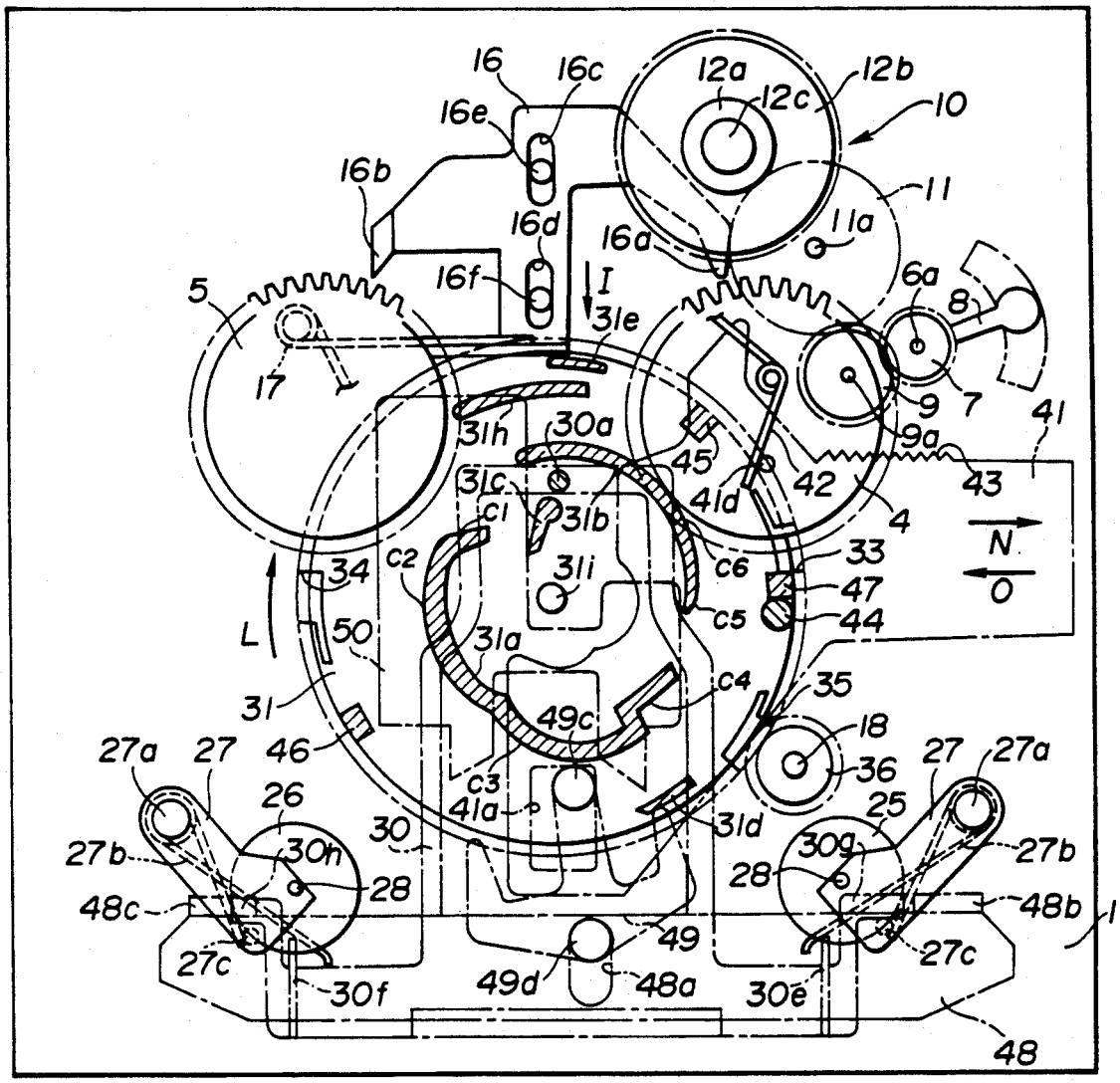
FIG. 15 is a plan view showing the arrangement of the recording and/or reproducing apparatus inclusive of the front surface side of the cam gear during the fast feed or the rewind mode switched from the forward mode.
Figure 16:
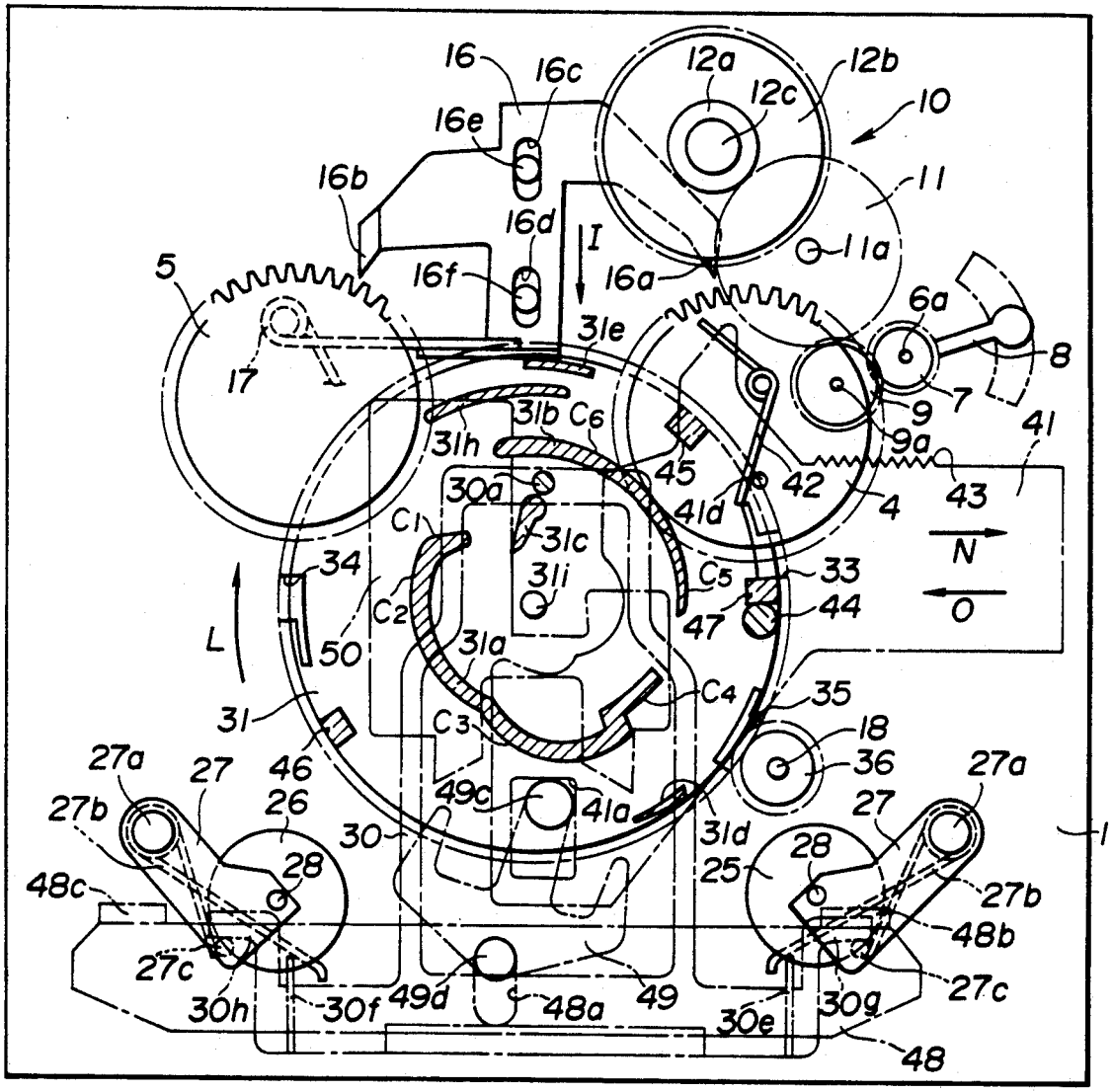
FIG. 16 is a plan view showing the arrangement of the recording and/or reproducing apparatus inclusive of the front surface side of the cam gear during the fast feed or the rewind mode switched from the reverse mode.

The second braking cam surface 31e is formed, as shown in FIGS. 15 and 16, so as to be concentric with the first braking cam surface 31d, so that, when the cam gear 31 is at the above mentioned third angular position, the cam surface 31e abuts on the brake lever 16 to shift the brake lever 16 in a direction away from the cam gear 31.

The forward/reverse changeover lever 14 is positioned with its forward end facing the reverse surface of the cam gear 31. With the one arm section 42b of the retention slider biasing spring 42 being retained by an engaging pin 14c mounted upright on a mid portion of the forward/reverse changeover lever 14, the lever 14 is rotationally biased in a direction in which, as shown by an arrow E in FIG. 2, a profiling end protuberance 14b of the lever 14 is moved towards the center of the cam gear 31. When the cam gear retention slider 41 is shifted towards the cam gear 31 by the reel motor 6, as indicated by an arrow 0 in FIG. 2, the forward/reverse changeover lever 14 is rotated as indicated by an arrow F in FIG. 2, against the bias of the retention slider biasing spring 42, by the engaging pin 14a formed parallel to engaging pin 14c being thrust by the cam gear retention slider 41. The forward/reverse changeover lever 14 is also rotated against the bias of the retention slider biasing spring 42, depending on the selected operational mode, as described subsequently, by the profiling and protuberance 14b being guided by first and second forward/reverse changeover lever actuating cam surfaces 31f, 31g protuberantly formed on the reverse surface of the cam gear 31.

Figure 10:
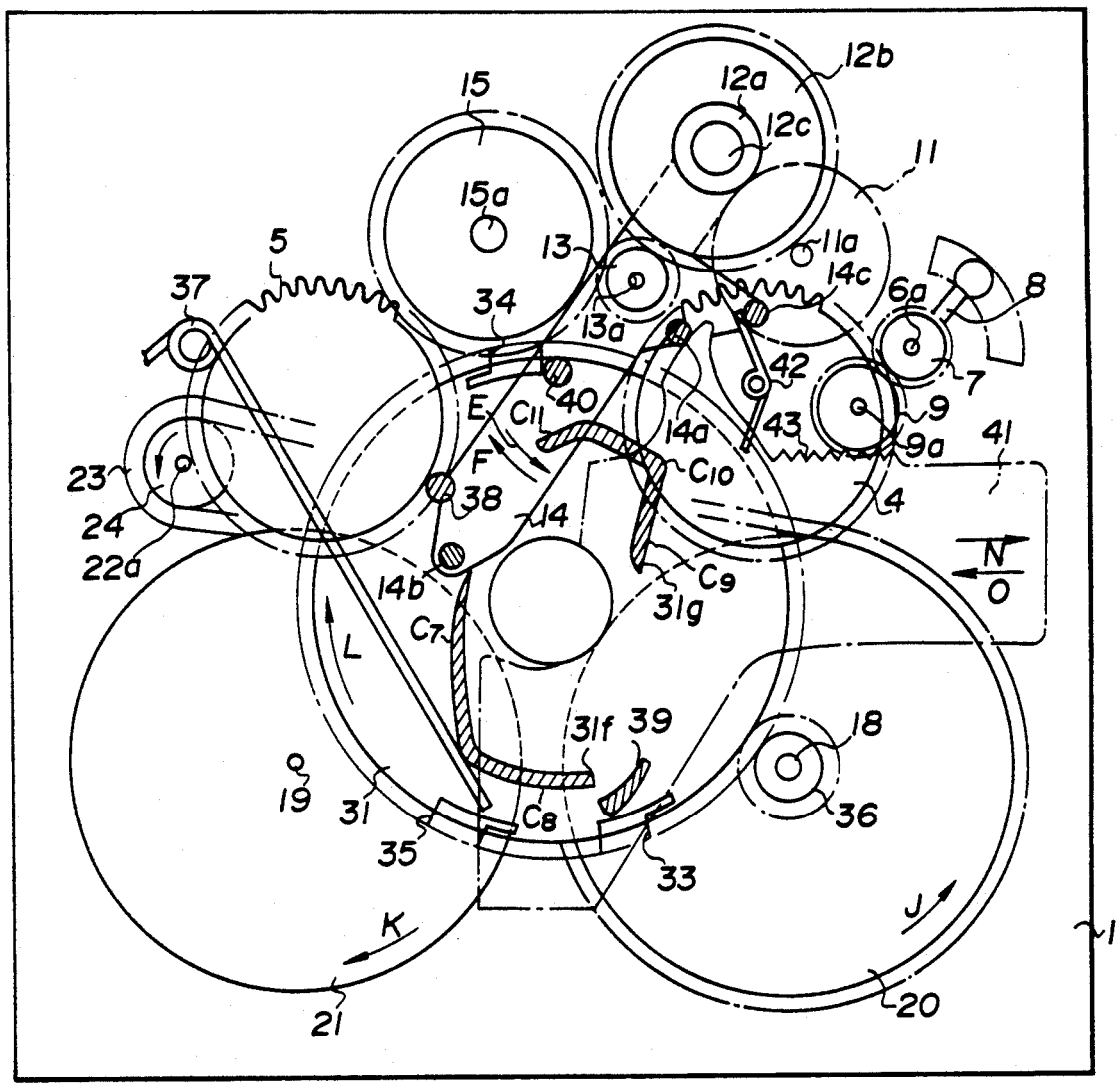
FIG. 10 is a plan view showing the arrangement of the recording and/or reproducing apparatus.

The first forward/reverse changeover level actuating cam surface 31f has an inclined guide cam section $c_7$ which abuts on the protuberance 14b to shift the protuberance 14b towards the outer periphery of the cam gear 31 against the bias of the retention slider biasing spring 42 if, at the time of starting of rotation of the cam gear 31 from the first angular position in a predetermined position, as shown in FIG. 9, the forward/reverse changeover lever 14 has been rotated by more than a predetermined angle in a direction in which the protuberance 14b is moved away from the center of the cam gear 31, as shown in FIG. 10. The one end of the inclined guide cam section c; is of somewhat reduced thickness for smoothly guiding the protuberance 14b.

If, at the time of starting the rotation of the cam gear 31 from the first angular position in the predetermined direction, the forward/reverse changeover lever 14 is not rotated in a direction away from the center of the cam gear 31, the protuberance 14b stops at an inner peripheral side of the cam gear 31 without abutting on the inclined guide cam section $c_7$. The first forward/reverse changeover lever actuating cam surface 31f has a forward/reverse changeover lever supporting cam section $c_8$ contiguous to the inclined guide cam section $c_7$. As shown in FIG. 14, the forward/reverse changeover lever supporting cam section $c_8$ is formed concentrically on the gear section 32, such that, when the cam gear 31 is at the above mentioned second angular position, the cam section $c_8$ halts the protuberance 14b at a predetermined position and causes rotation of the lever 14 to such an extent that the fourth intermediate gear 13 meshes with the inverting gear 15.

As shown in FIG. 18, the second forward/reverse changeover lever actuating cam surface 31g is formed so that, when the cam gear 31 is at the above mentioned third angular position, the cam surface 31g halts the protuberance 14b at a predetermined position and causes rotation of the lever 14 to such an extent that the fourth intermediate gear 13 meshes with the inverting gear 15. That is, the second forward/reverse changeover lever actuating cam surface 31g has an inclined guide cam section $c_9$ which, when the forward/reverse changeover lever 14 has been rotated by more than a predetermined angle in a direction in which the protuberance 14b is spaced from the center of cam the gear 31 when the cam gear 31 reaches the third angular position, abuts on the protuberance 14b to shift the protuberance towards the outer periphery of the cam gear 31 against the bias of the retention slider biasing spring 42.

Meanwhile, if the forward/reverse changeover lever 14 has not been rotated in a direction in which the protuberance 14b is spaced from the center of the cam gear 31 when the cam gear 31 reaches the third angular position, the protuberance 14b does not abut on the inclined guide cam section $c_9$ but is halted at the inner peripheral side of the cam gear 31. The second forward/reverse changeover lever actuating cam surface 31g has a forward/reverse changeover lever supporting cam section $c_{10}$ contiguous to the inclined guide cam section $c_9$.

As shown in FIG. 18, the forward/reverse changeover lever supporting cam section $c_{10}$ is formed concentrically with the forward/reverse changeover lever supporting cam section $c_8$ of the first forward/reverse changeover lever actuating cam surface 31g for halting the protuberance 14b at a predetermined position when the cam gear 31 reaches the above mentioned third angular position. The second forward/reverse changeover lever actuating cam surface 31g also has an inclined cam section $c_{11}$ which is contiguous to the forward/reverse changeover lever supporting cam section $c_{10}$ and which gradually shifts the protuberance 14b towards the center of the cam gear 31 under the bias of the retention slider biasing spring 42 when the cam gear 31 is rotated in a predetermined direction from the above mentioned third angular position.

Figure 7:
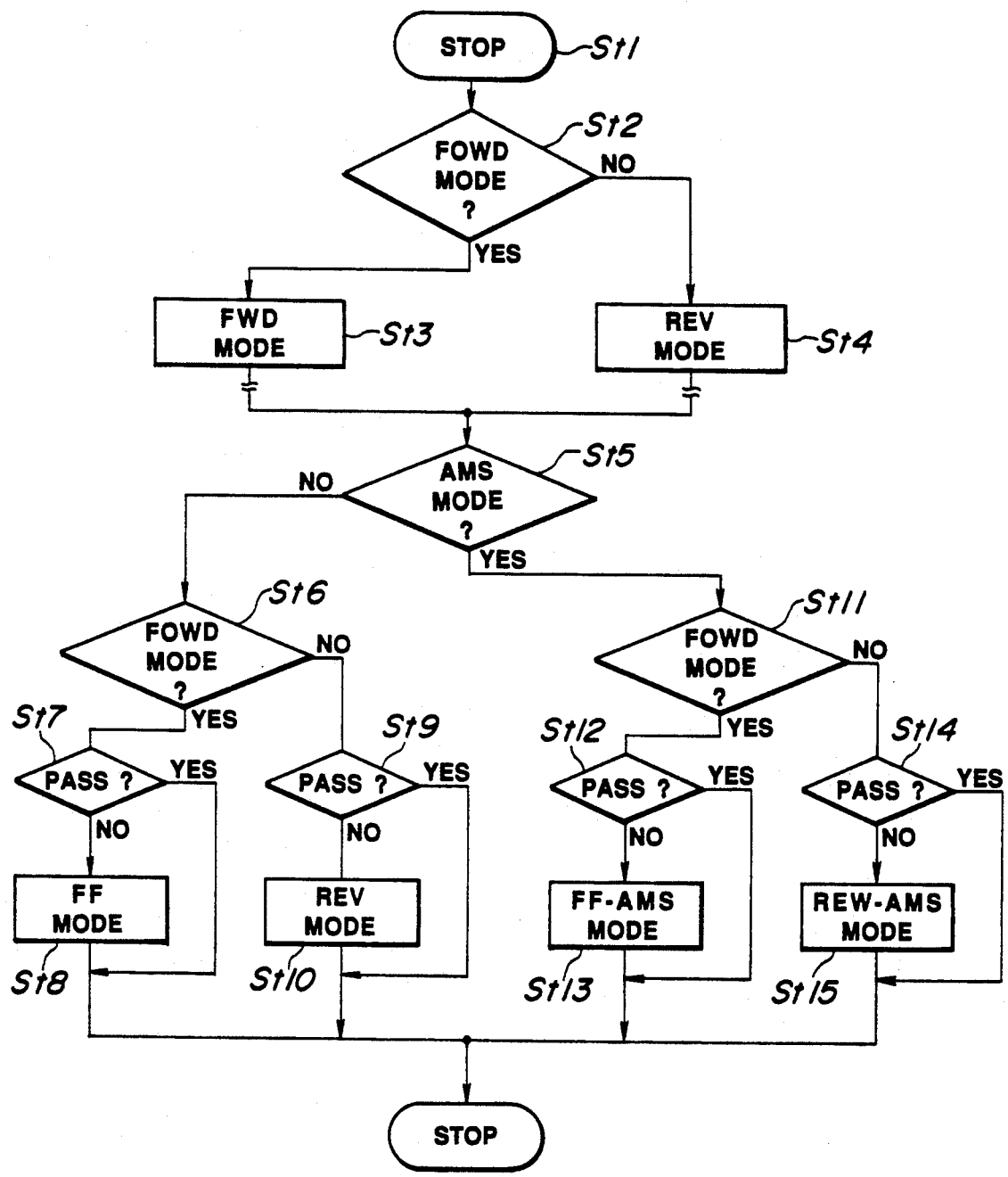
FIG. 7 is a flow chart showing the sequence of switching of the operational modes in the operational mode switching mechanism of the recording and/or reproducing apparatus.

Referring to the flow chart of FIG. 7 showing the switching of the operational modes by the above described operational mode switching mechanism of the tape recorder, switching of the operational modes is started from the above mentioned stop mode at step st1 and one of the forward or reverse side modes is selected at step st2. If the forward side mode is selected, control proceeds to step st3 and, if the reverse side mode is selected, control proceeds to step st4.

At step st3, the above mentioned forward recording/reproducing mode is selected.

At step st4, the above mentioned reverse recording/reproducing mode is selected.

If the operational mode switching is commanded at step st3 and st4, control proceeds to step st5, where it is determined if the air or number selecting mode is selected. If the air selecting mode is not selected, control proceeds to step st6. If the air selecting mode is selected, control proceeds to step st11.

At step st6, one of the forward or reverse side modes is selected. If the forward mode is selected, control proceeds to step st7 and, if the reverse mode is selected, control proceeds to step st9.

At step st7, if the next following operational mode is passed, the stop mode is set and, if otherwise, control proceeds to step st8, where the above mentioned fast feed mode is selected.

At step st9, if the next following operational mode is passed, the stop mode is set and, if otherwise, control proceeds to step st10, where the above mentioned rewind mode is selected.

On the other hand, at step st11, one of the forward or reverse side modes is selected. If the forward mode is selected, control proceeds to step st12 and, if the reverse mode is selected, control proceeds to step st14.

At step st12, if the next following operational mode is passed, the stop mode is set and, if otherwise, control proceeds to step st13, where the above mentioned fast feed air selecting mode is selected.

At step st14, if the next following operational mode is passed, the stop mode is set and, if otherwise, control proceeds to step st15, where the above mentioned rewind air selecting mode is selected.

In this manner, selective switching of the operational modes is achieved.

EXPLANATION ON SWITCHING FROM STOP MODE TO RECORDING OR REPRODUCING MODE

(FIGS. 3 to 14, 22 and 23)

Figure 22:
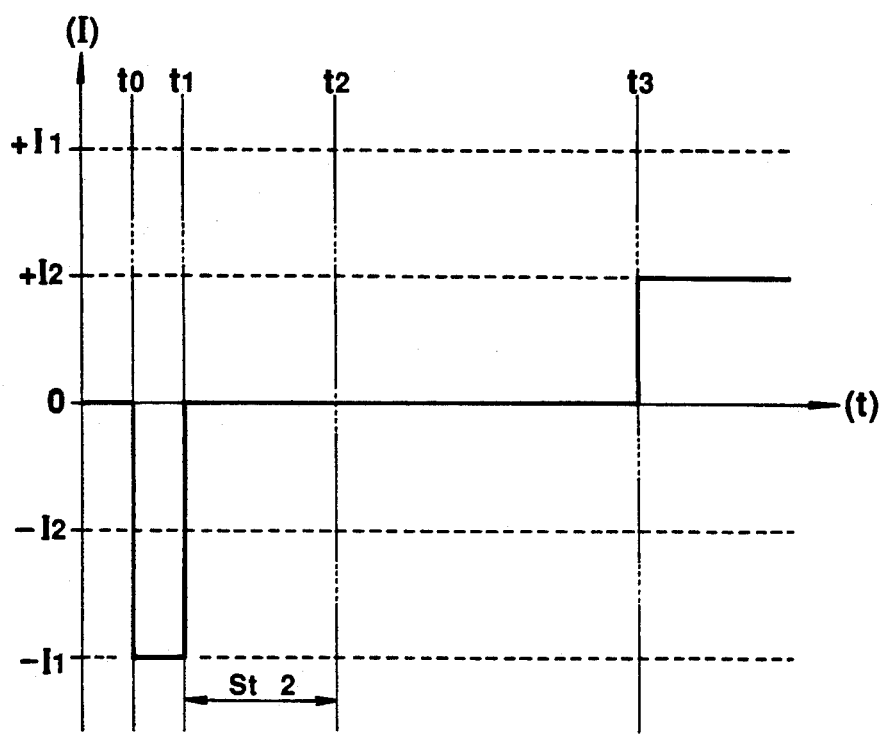
FIG. 22 is a timing chart showing the current supplied to the reel motor at the time of switching from the stop mode to the forward mode by the operating mode switching mechanism of the recording and/or reproducing apparatus.
Figure 23:
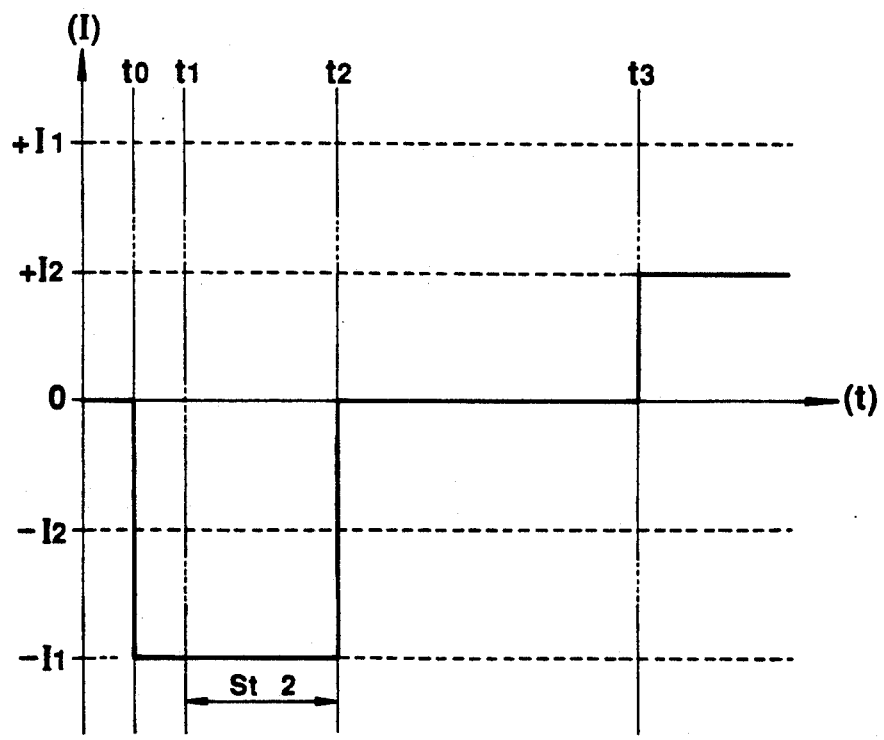
FIG. 23 is a timing chart showing the current supplied to the reel motor at the time of switching from the stop mode to the reverse mode by the operating mode switching mechanism of the recording and/or reproducing apparatus.

With the above described tape recorder, for switching from the above-mentioned stop mode in which the cam gear 31 is at the above mentioned first angular position shown in FIGS. 8 and 9 to the above mentioned forward or reverse recording/reproducing mode, the electrical current is supplied to the reel motor 6 for driving the reel motor in reverse for a predetermined time as shown in FIGS. 22 and 23, and for driving the reel motor in the forward direction when the cam gear 31 is at the above mentioned second angular position.

In FIGS. 22 to 29, referred to throughout the following description, the abscissa denotes the lapse of time (t) and the ordinate the amount of the electrical current I supplied to the reel motor 6. The positive (+) and minus (−) signs of the current I indicate the polarity of the current for driving the reel motor 6 in the forward or reverse direction, respectively.

For switching to the forward recording/reproducing mode, a predetermined current $-I_1$ for driving the reel motor 6 in reverse is first supplied at time $t_0$ in FIG. 22 (first angular position). The current $-I_2$, which is lesser than $-I_1$, can also be used. At this time, the cam gear retention slider 41 is shifted towards the cam gear 31. The abutting engagement between the cam gear retention projection 44 and the first mating retention projection 45 is released and the cam gear 31 starts to be rotated by cam gear driving gear 36. The forward/reverse changeover lever 14 is rotated in a direction in which, as shown by an arrow F in FIG. 9, the profiling end protuberance 14b is spaced away from the center of the cam gear 31.

Then, as shown in FIG. 10, supply of the electrical current $-I_1$ to reel motor 6 is discontinued before the first forward/reverse changeover lever actuating cam surface 31f reaches a position corresponding to the protuberance 14b of the changeover lever 14, that is at time $t_1$ in FIG. 22. The cam gear retention slider 41 and the forward/reverse changeover lever 14 are restored in this manner under the bias of the retention slider biasing spring 42. Thus the fourth intermediate gear 13 meshes with the forward side reel gear 14.

When cam gear 31 continues to be rotated in this state, the pinch roll changeover lever 50 is shifted by the pinch roll switching cam surface 31c. Since the cam gear retention slider 41 has been restored at this time to its initial position, the pinch roll selecting lever 48 is positioned towards the forward side pinch roll 25.

The head supporting base plate 30 is shifted by the first head supporting base plate shifting, cam surface 31a, so that the magnetic head 29 and the forward side pinch roll 25 is moved into contact with the magnetic tape 105. The brake lever 16 is shifted by the first braking cam surface 31d to release the braking applied to the reel gears 4, 5.

When the cam gear 31 reaches the second angular position in this manner, the cam gear retention projection 44 and the second mating retention projection 46 are abuttingly engaged with each other to halt the cam gear 31. At the time, that is at time $t_3$ in FIG. 22, the current $+I_2$ driving the reel motor 6 in the forward direction is supplied to the reel motor 6. The forward side reel gear 4 is then rotationally driven, as shown by an arrow 6 in FIG. 12, for selecting the forward recording/reproduction.

For switching the reverse recording/reproducing mode, the current $-I_1$ driving the reel motor 6 in reverse is first supplied at time $t_3$ in FIG. 23. A current $-I_2$, lesser than $-I_1$, can also be employed. When the above mentioned first forward/reverse changeover lever actuating cam surface 31f reaches a position corresponding to the protuberance 14b of the forward-/reverse changeover lever 14, as shown in FIG. 10, the supply of the current to reel motor 6 is continued. The operation of shifting the cam gear retention slider 41 and the forward/reverse changeover lever 14 towards the cam gear 31 is then continued. The protuberance 14b is shifted by the first forward/reverse changeover lever actuating cam surface 31f for rotating the forward/reverse changeover lever 14 so that the protuberance 14b will be at the peripheral rim of the cam gear 31. Thus the fourth intermediate gear 13 meshes with the reversing gear 15 meshing with the reverse side reel gear 5.

When the cam gear 31 continues its rotation, the pinch roll switching lever 50 is shifted by the pinch roll switching cam surface 31c. Since the cam gear retention slider 41 has been shifted, the pinch roll selecting lever 48 is positioned towards the reverse side pinch roll 26, as shown in FIGS. 5 and 6. The magnetic head 29 is rotated by the pinch roll selecting lever 48 by means of the rotation supporting mechanism 29a.

At this time, that is at time $t_2$ later than time $t_1$ in FIG. 22, supply of the current $-I_1$ to the reel motor 6 is discontinued. On the surface of the cam gear 31, there is formed a reverse state maintaining cam surface 31h for supporting the cam gear retention projection 44 for maintaining the slider 41 in the shifted position for a predetermined time period on cessation of supply of the current $-I_1$ to reel motor 6.

The head supporting base plate 30 is shifted by the first head supporting base plate shifting cam surface 31a, with the magnetic head 29 and the reverse side pinch roll 26 being shifted into contact with the magnetic tape 105. The braking lever 16 is shifted by the first braking cam surface 31d to release the braking applied to reel gears 4, 5.

When the cam gear 31 reaches the second angular position in this manner, the cam gear retention projection 44 and the second mating retention projection 46 are abuttingly engaged with each other, as shown in FIG. 13, to halt the cam gear 31. When the predetermined current $+I_2$ driving the reel motor 6 in the forward direction is supplied to the reel motor 6 at this time, that is at time $t_3$ in FIG. 23, the reverse side reel gear 5 is rotated as shown by an arrow H in FIG. 14 to select the reverse recording/reproducing mode. In this manner, selection of the forward side mode and the reverse side mode at step st2 in FIG. 7 is performed between time $t_1$ and time $t_2$ in FIGS. 22 and 23.

EXPLANATION ON SWITCHING FROM RECORDING OR REPRODUCING MODE TO FAST FEED OR REWIND MODE

(FIGS. 11 to 18, 24 and 25)

Figure 24:
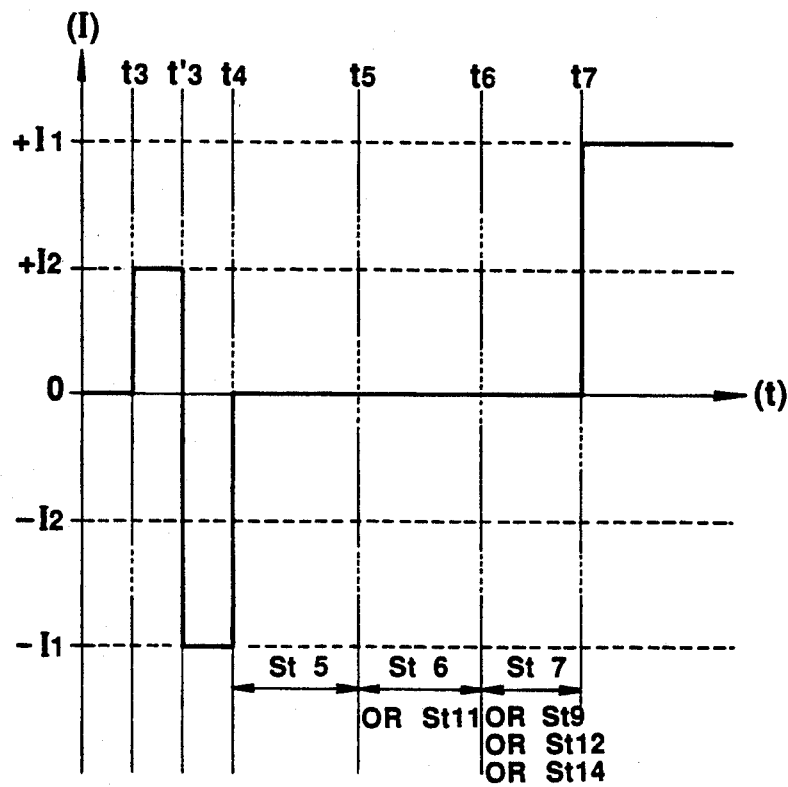
FIG. 24 is a timing chart showing the current supplied to the reel motor at the time of switching from the forward or reverse mode to the fast mode by the operating mode switching mechanism of the recording and/or reproducing apparatus.
Figure 25:
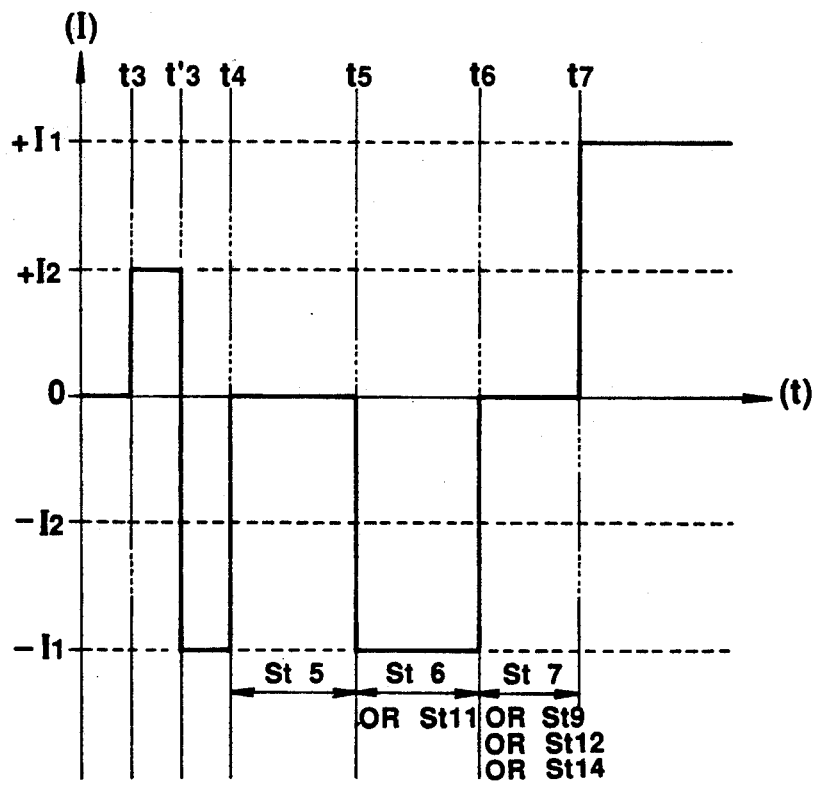
FIG. 25 is a timing chart showing the current supplied to the reel motor at the time of switching from the forward mode or the reverse mode to the rewind mode by the operating mode switching mechanism of the recording and/or reproducing apparatus.

With the above tape recorder, when switching is to be made from the forward or reverse recording/reproducing mode, in which the cam gear 31 is at the second angular position as shown in FIGS. 11 to 14, to the fast feed mode or the rewind mode, the current for driving the reel motor 6 in the reverse direction for a predetermined time is supplied to the reel motor 6, and the current for driving the reel motor 6 in the forward direction is supplied to the reel motor 6 when the cam gear 31 reaches the above mentioned third angular position, as shown in FIGS. 24 and 25.

Figure 26:
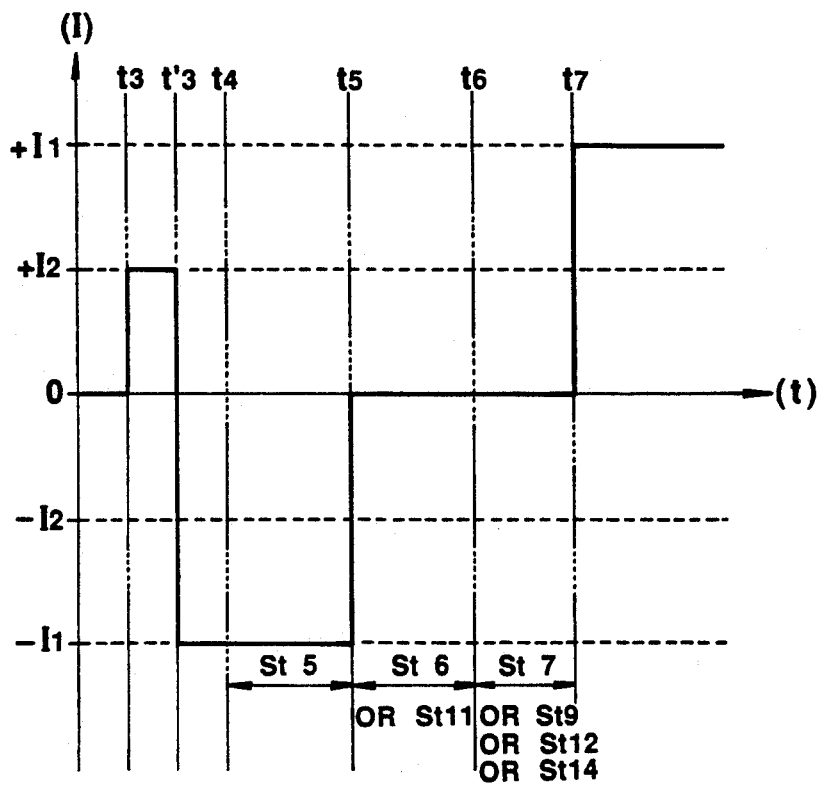
FIG. 26 is a timing chart showing the current supplied to the reel motor at the time of switching from the forward or reverse mode to the fast feed air selecting mode by the operating mode switching mechanism of the recording and/or reproducing apparatus.

That is, for switching to the fast feed or rewind mode, the predetermined current $-I_1$ for driving the reel motor 6 in the reverse direction is first supplied at time $t_3'$ in FIG. 25 and 26. The current $-I_2$, lesser than $-I_1$, can also be employed. In this manner, the cam gear retention slider 41 is shifted towards the cam gear 31, which then starts to be rotated by the cam gear driving gear 36. The forward/reverse changeover lever 14 is rotated in a direction in which the protuberance 14b is spaced apart from the center of cam gear 31, as shown by an arrow F in FIGS. 12 and 14. The braking lever 16 is released from the shifting operation by the first braking cam surface 31d to brake the reel gears 4, 5.

When supply of the current $-I_1$ to reel motor 6 is discontinued at time $t_4$ in FIGS. 24 and 25, the cam gear retention slider 41 is reset to its initial position under the bias of the retention slider biasing spring 42. Since the forward/reverse changeover lever actuating cam surface 31f has been shifted to a position not corresponding to the protuberance 14b, the forward/reverse changeover lever 14 is reset to its initial position, under the bias of the retention slider biasing spring 42. Thus the fourth intermediate year 13 meshes with the forward side reel gear 4.

When a region between the first head supporting base plate shifting cam surface 31a and the second head supporting base plate shifting cam surface 31b reaches a position corresponding to the head shifting pin 30a, it is determined between time $t_4$ and time $t_5$ if the air selecting mode at step st5 is selected. That is, since supply of the current $-I_1$ for driving the reel motor 6 in the reverse direction is now discontinued, the head supporting base plate 30, which has been shifted by the first head supporting base plate shifting cam surface 31a, is reset by the head supporting base plate biasing spring 30c. At this time, the head shifting pin 30a is moved towards the center of the cam gear 31 through the region between the first and second head supporting base plate shifting, cam surfaces 31a and 31b, whereas the magnetic head 29 and the forward or reverse side pinch rolls 25, 26 are shifted in a direction away from the magnetic tape 105.

When the cam gear 31 continues to be rotated, the second forward/reverse changeover lever actuating cam surface 31g reaches a position corresponding to the profiling protuberance 14b. Selection between the forward and reverse modes at step st6 in FIG. 7 is now performed between time $t_5$ and time $t_6$. That is, unless the current $-I_1$ for driving the reel motor 6 in reverse is supplied at this time to reel motor 6, the forward/reverse changeover lever 14 remains reset to its initial position, under the bias of the retention slider biasing spring 42, so that the fast feed mode is selected.

When the current $-I_1$ for driving the reel motor 6 in reverse is supplied at this time, that is at time $t_5$ in FIG. 25, the forward/reverse changeover lever 14 is rotated against the bias of the retention slider biasing spring 42. Thus the profiling protuberance 14b is guided by the second forward/reverse changeover lever actuating cam surface 31g, with the forward/reverse changeover lever 14 being rotated until the protuberance 14b is at the peripheral rim of the cam gear 31. Thus the fourth intermediate gear 13 meshes with the inverting gear 15 meshing with the reverse side reel gear 5 to select the rewind mode. In this case, supply of the current $-I_1$ for driving the reel motor 6 in reverse is discontinued before the cam gear 31 reaches the third angular position, that is at time $t_6$ in FIG. 25.

When the cam gear 31 reaches the third angular position, the cam gear retention projection 44 is abuttingly engaged with the third mating retention projection 47, as shown in FIGS. 15 or 16, to halt the cam gear 31. Meanwhile, when switching from the forward mode to the fast feed or rewind mode, the pinch roll selecting lever 48 has been shifted towards the forward side pinch roll 25, as shown in FIG. 15, whereas, when switching from the reverse mode to the fast feed or rewind mode, the pinch roll selecting lever 48 has been shifted towards the reverse side pinch roll 26, as shown in FIG. 26.

At this time, that is at time t; in FIGS. 24 or 25, the brake lever 16 is shifted by the second braking cam surface 31e to release the braking applied to the reel gears 4, 5. When the predetermined current $+I_1$ for driving the reel motor 6 in the forward direction is supplied to the reel motor 6, the forward or reverse side reel gears 4, 5 are rotated, as shown in FIGS. 17 or 18, so that the fast feed mode or the rewind mode is selected.

For fast feed and rewind modes, it is necessary to increase the rotational speed of the reel motor 6 to a value higher than that for forward or reverse recording/reproducing mode. Thus the current $+I_1$ supplied at this time to reel motor 6 is selected to be higher than the current $+I_2$ supplied to the reel motor 6 for the forward or reverse recording/reproducing modes.

EXPLANATION ON SWITCHING FROM RECORDING OR REPRODUCING MODE TO FAST FEED AIR SELECTION OR REWIND AIR SELECTION MODE (FIGS. 11 to 14, 17 to 20, 26 and 27).

Figure 27:
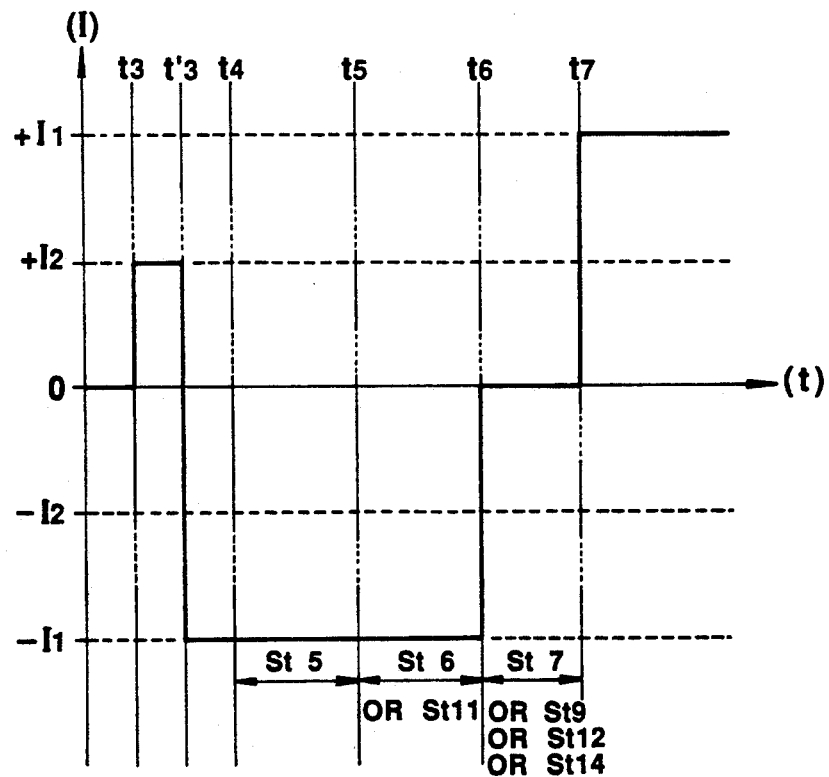
FIG. 27 is a timing chart showing the current supplied to the reel motor at the time of switching from the forward mode or reverse mode to the rewind air selecting mode by the operating mode switching mechanism of the recording and/or reproducing apparatus.

With the above described tape recorder, when switching from the forward recording/reproducing mode or the reverse recording/reproducing mode, in which the cam gear 31 is at the second angular position, as shown in FIGS. 11 to 14, to the fast feed air selecting mode or the rewind air selecting mode, the current for driving the reel motor 6 in reverse for a predetermined time is supplied to the reel motor in the same way as when switching to the above described fast feed or rewind mode, as shown in FIGS. 26 and 27, while the current for driving the reel motor 26 in reverse is supplied to the reel motor during the period of selecting the air selecting mode.

That is, for switching to the fast feed air selecting mode or the rewind air selecting mode, supply of the predetermined current $-I_1$ for driving the reel motor 6 in reverse is started at time $t'_3$ in FIGS. 26 and 27. The current $-I_2$, lesser in intensity than $-I_1$, can also be employed. The cam gear retention slider 41 is shifted in this manner towards the cam gear 31, which then starts to be rotated by the cam gear cam gear drive gear 36. The brake lever 16 is released from the shifting imposed by the first braking cam surface 31d to brake the reel gears 4, 5.

When the region between the first head supporting base plate shifting cam surface 31a and the second head supporting base plate shifting cam surface 31b reaches the position corresponding to the head shifting pin 30a, with the supply of the current $-I_1$ to the reel motor 6 being continued, it is determined between time $t_4$ and time $t_5$ if the air selecting mode at step st5 in FIG. 7 is to be selected. That is, since the current $-I_1$ driving the reel motor 6 in reverse is supplied to the reel motor 6, the head supporting base plate 30 is retained by the cam gear retention slider 41 so that the head shifting pin 30a is not reset towards the center of the cam gear 31.

As the cam gear 31 further continues its rotation, the second forward/reverse changeover lever actuating cam surface 31g reaches the position corresponding to the profiling projection 14b. Selection between the forward mode and the reverse mode at step st11 in FIG. 7 is performed between time $t_5$ and time $t_6$. That is, if the supply of the current $-I_1$ for driving the reel motor 6 in reverse is discontinued at time $t_5$ in FIG. 26, the forward/reverse changeover lever 14 is reset to its initial position, under the bias of the retention slider biasing spring 42, so that the fast feed air selecting mode is selected.

If the supply of the current $-I_1$ to reel motor 6 for driving the reel motor 6 in reverse is continued at this time, the forward/reverse changeover lever 14 remains in the state of having been rotated by the cam gear retention slider 41 against the bias of the retention slider biasing spring 42. Thus the profiling protuberance 14b is guided by the second forward/reverse changeover lever actuating cam surface 31g so that the forward-/reverse changeover lever 14 is rotated towards the periphery of the cam gear 31. Thus the fourth intermediate gear 13 meshes with the inverting gear 15 meshing with the reverse side reel gear 5 to select the rewind air selecting mode. In such case, supply of the current $-I_1$ for driving the reel motor 6 in reverse is discontinued at time $t_6$ in FIG. 27.

When the cam gear 31 reaches the third angular position, the cam gear retention projection 44 is abuttingly engaged with the third mating retention projection 47, as shown in FIGS. 19 or 20, for halting the cam gear 31.

Meanwhile, when switching from the forward recording/reproducing mode to the fast feed air selection mode or the rewind air selection mode, the pinch roll selecting lever 48 is positioned towards the forward side pinch roll 25, as shown in FIG. 19. On the other hand, when switching from the reverse mode to the fast feed or rewind air selection mode, the pinch roll selecting lever 48 is positioned towards the reverse side pinch roll 26, as shown in FIG. 20.

The head supporting base plate 30 is held by the second head supporting base plate shifting cam surface 31b at a position in which the magnetic head 29 contacts the magnetic tape 105. The amount of movement of the head supporting base plate 30 is lesser than that when the base plate 30 is shifted by the first head supporting base plate shifting cam surface 31a, with the pinch rolls 25, 26 being spaced apart from the capstans 18, 19.

At this time, that is at time $t_7$ in FIGS. 26 and 27, the brake lever 16 is shifted by the second braking cam surface 31e to release the braking applied to the reel gears 4, 5. When the predetermined current $+I_1$ for driving the reel motor 6 in the forward direction is supplied to reel motor 6, the forward or reverse side reel gear 4 or 5 is rotated, as shown in FIGS. 17 or 18. That is, the magnetic tape 105 is run at higher speed, with the magnetic head 29 remaining in a sliding contact state with the magnetic tape 105, so that the fast feed air selecting mode or the rewind air selecting mode is selected.

Figure 28:
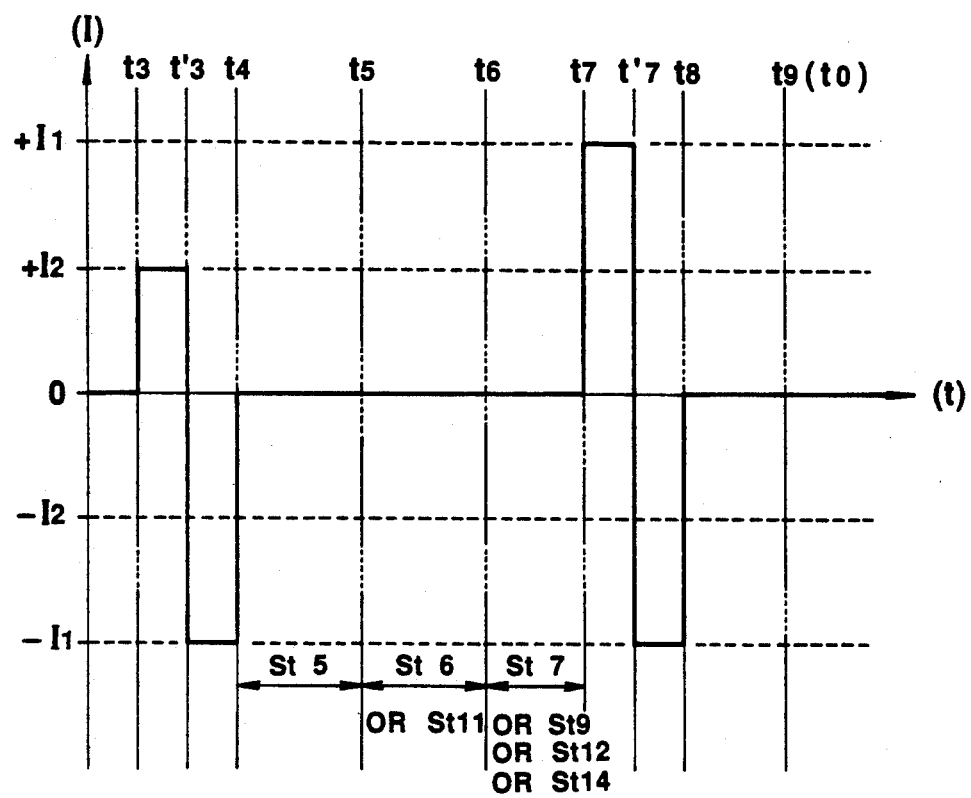
FIG. 28 is a timing chart showing the current supplied to the reel motor at the time of switching from the fast feed mode or the rewind mode or from the fast feed air selecting mode or the rewind air selecting mode to the stop mode by the operational more switching mechanism of the recording and/or reproducing mode.

With the above described tape recorder, when switching is to be made from the fast feed or rewind mode or from the fast feed or rewind air selecting mode, in which the cam gear 31 is at the third angular position, as shown in FIGS. 15 to 20, to the stop mode, the current for driving the reel motor 6 for a predetermined time is supplied to the reel motor 6, as shown in FIG. 28.

That is, for switching to the stop mode, supply of the predetermined current $-I_1$ for driving the reel motor 6 in reverse is started at time $t_7'$ in FIG. 28. This causes the cam gear retention slider 41 to be shifted towards cam gear 31, with cam gear 31 starting to be rotated by cam gear cam gear drive gear 36. The forward/reverse changeover lever 14 is rotated in a direction in which the protuberance 14b is spaced apart from the center of cam gear 31 as shown by arrows F in FIGS. 17 or 18. The brake lever 16 is released from the shifting action imposed by the second braking cam surface 31e to brake the reel gears 4, 5.

When the supply of the current $-I_1$ to the reel motor 6 is discontinued at time $t_8$ in FIG. 28, the cam gear retention slider 41 and the forward/reverse changeover lever 14 are reset to their initial positions under the bias of the retention slider biasing spring. As the cam gear 31 continues its rotation to reach the first angular position at time $t_9$ ($t_0$) in FIG. 28, the cam gear retention projection 44 is abuttingly engaged with the first mating retention projection 45, as shown in FIG. 8, for halting the cam gear 31.

EXPLANATION ON SWITCHING FROM RECORDING OR REPRODUCING MODE TO STOP MODE (FIGS. 11 to 14 and 29)

Figure 29:
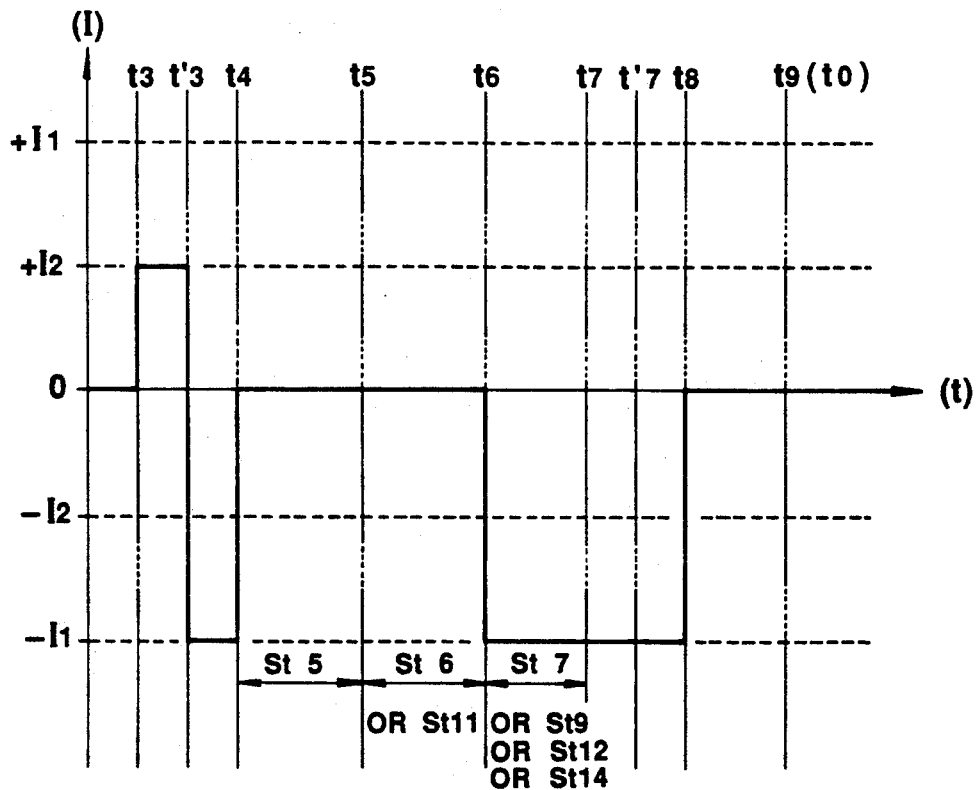
FIG. 29 is a timing chart showing the current supplied to the reel motor at the time of switching from the forward mode or the reverse mode to the stop mode by the operating mode switching mechanism of the recording and/or reproducing apparatus.

With the above tape recorder, when switching is to be made from the forward or reverse mode in which the cam gear 31 is at the above mentioned second angular position, as shown in FIGS. 11 to 14, to the stop mode, the current for driving the reel motor 6 in reverse for a predetermined time period is supplied to reel motor 6, as when switching to the fast feed mode, as shown in FIG. 29, and further the current for driving the reel motor 6 in reverse, lest the cam gear 31 should be halted at the third angular position, is supplied to the reel motor 6.

Thus, for switching to the stop mode, the supply of the predetermined current $-I_1$ to reel motor 6 for driving the reel motor 6 in reverse is started at time $t_3$ in FIG. 29. This causes the cam retention slider 41 to be shifted towards cam gear 31 which is starting to be rotated by cam gear cam gear drive gear 36. The brake lever 16 is released from the shifting action imposed by the first braking cam surface 31d to brake the reel gears 4, 5.

When the supply of the current $-I_1$ to the reel motor 6 is discontinued at time $t_4$ in FIG. 29, cam gear retention slider 41 is reset to the initial position under the bias of the retention slider biasing spring 42. Since the first forward/reverse changeover lever actuating cam surface 31f has been shifted to a position not corresponding to the profiling protuberance 14b, the forward/reverse changeover lever 14 is reset to its original position under the bias of the retention slider biasing spring 42.

When the region between the first head supporting base plate shifting cam surface 31a and the second head supporting base plate shifting cam surface 31b reaches a position corresponding to the head shifting pin 30a, the head shifting pin is moved towards the center of the cam gear 31, by way of the region between the cam surfaces 31a and 31b, since the supply of the current $-I_1$ for driving the reel motor 6 in reverse is discontinued, such that the head supporting base plate 30, which has been shifted by the first head supporting base plate shifting cam surface 31a, is reset by the head supporting base plate biasing spring 30c.

Figure 21:
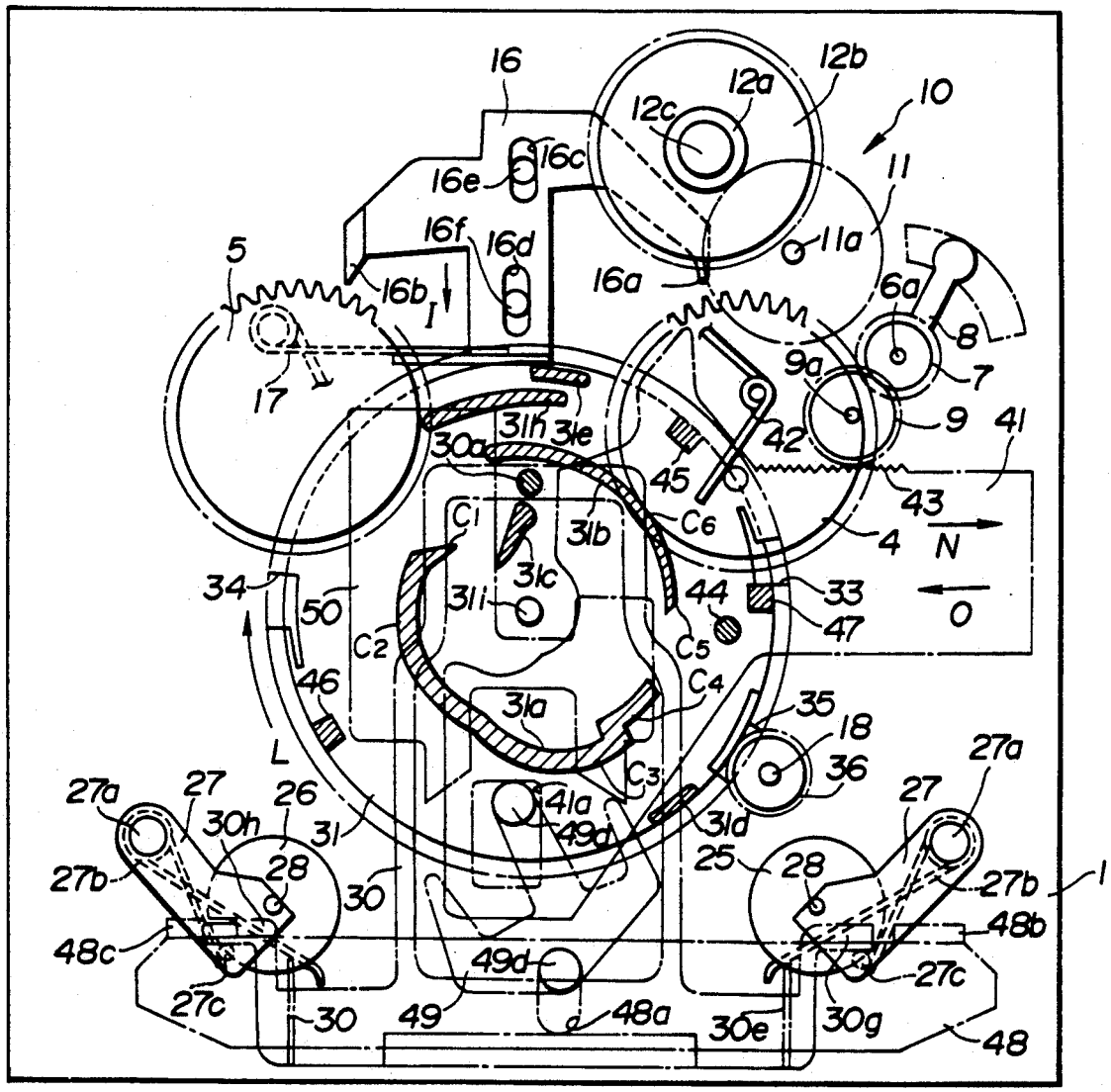
FIG. 21 is a plan view showing the arrangement of the recording and/or reproducing apparatus inclusive of the front surface side of the cam gear in the state of passing through the fast feed mode.

The supply of the current $-I_1$ for driving the reel motor 6 in reverse is started before the cam gear 31 reaches the third angular position, that is at time $t_6$ in FIG. 29. The current $-I_2$, lesser in intensity than $-I_1$, can also be employed. When the cam gear 31 reaches the third angular position, the cam gear retention slider 41 has been shifted towards the cam gear 31, as shown in FIG. 21, so that the cam gear retention projection 44 is not abuttingly engaged with the third mating retention projection 47, with the cam gear 31 continuing its rotation. When the supply of the current $-I_1$ to the reel motor 6 is discontinued at time $t_8$ in FIG. 29, the cam gear retention slider 41 and the forward/reverse changeover lever 14 are reset to their initial position under the bias of the retention slider biasing spring 42. When the cam gear 31 continues its rotation and reaches the first rotational position at $t_9$ ($t_0$) in FIG. 29, the cam gear retention projection 44 and the first mating retention projection 45 are abuttingly engaged with each other, as shown in FIG. 8, for halting the cam gear 31 for setting the stop mode.

Although the present invention has been shown and described with respect to certain preferred embodiments, various changes and modifications which are obvious to a person skilled in the art to which the invention pertains are deemed to lie within the spirit and scope of the invention as claimed.

What is claimed is:

1. A mode switching mechanism in an apparatus for recording and/or reproducing signals from or onto tape wound on a supply reel and a take up reel, the mechanism comprising capstan means for transporting the tape;

a capstan motor for rotationally driving the capstan means;

a pair of reel gears for driving the supply and take up reels;

a reel motor for selectively driving the reel gears, the reel motor being rotatable in either direction;

transmission gear means for transmitting drive power of the reel motor;

movable swing arm means for rotatably supporting the transmission gear means, the movable swing arm means being movable selectively in a first direction and in a second direction in dependence upon the rotational direction of the reel motor;

intermediate gear means for selectively transmitting the drive power from the transmission gear means to the reel gears;

drive gear means rotationally driven by the capstan motor;

cam gear means having a peripheral gear section inclusive of interrupted portions and also having a cam surface section, a triggered section and a retained portion on a major planar surface, the cam gear means being rotationally driven in one direction by means of the gear section by the drive gear means;

mode switching means for selectively switching and setting a plurality of operational modes by the cam surface section in dependence upon a rotational angular position of the cam gear means;

cam gear retention means having a retainer for retaining the retained portion of the cam gear means and being movably supported between a first position in which the retainer retains the retained portion and the rotational angular position of the cam gear means is set to a position in which the interrupted portions face the drive gear means and a second position of releasing retention between the retainer and the retained portion; and trigger means for thrusting the triggered section for rotationally biasing the cam gear means in one direction;

wherein the reel motor can be rotationally driven in a forward direction to shift the movable swing arm means in the first direction for rotationally driving the reel gears, and the reel motor can be rotationally driven in a reverse direction for shifting the movable swing arm means in the second direction, the cam gear retention means being moved from the first position to the second position to release retention between the retainer and the retained portion, and the cam gear means being rotationally driven for driving the mode switching means for switching operational modes.

2. The mode switching mechanism for the recording and/or reproducing apparatus according to clam 1 wherein the cam gear means include a plurality of interrupted portions, a plurality of triggered sections and a plurality of retained portions, there being a plurality of rotational angular positions in which the drive gear means and the interrupted portions face each other.

3. The mode switching mechanism for the recording and/or reproducing apparatus according to claim 2 wherein the cam gear means include at least three interrupted portions, triggered sections and retained portions, there being separate rotational angular positions in which the drive gear means faces the three interrupted portions for setting STOP mode, record/playback mode and fast feed/rewind mode, respectively.

4. The mode switching device in a recording and/or reproducing apparatus according to claim 1 which further includes a magnetic recording/reproducing head and wherein the mode switching means comprises movable head base means for supporting at least the magnetic recording/reproducing head and for shifting pinch rollers associated with the capstan means, movable braking means for applying and releasing braking of the reel gears, and movable reel gear drive means for selectively engaging the intermediate transmission gear for transmitting drive power of the reel motor at least to the take-up reel gear.

5. The mode switching mechanism for a recording and/or reproducing apparatus according to claim 1 wherein a record/playback mode is set when a forward rotational speed of the reel motor is set to a first rotational speed and a fast feed/rewind mode is set when the forward rotational speed is set to a second rotational speed higher than the first speed.

6. The mode switching mechanism for the recording and/or reproducing apparatus according to claim 2 wherein the cam gear means include at least three interrupted portions, triggered sections and retained portions, the drive gear means faces the three interrupted portions for selecting from among STOP mode, record/playback mode in the forward/reverse direction, fast feed/rewind mode and fast feed-music search-/rewind-music search mode.

7. The mode switching mechanism for the recording and/or reproducing apparatus according to claim 1 wherein the capstan means includes a pair of capstans and associated pinch rollers, and wherein the mode switching means comprises movable head base means for supporting at least one magnetic head and for shifting the pair of pinch rollers, movable pinch roller selecting means for selecting one of the pair of associated pinch rollers and capstans, movable braking means for applying and releasing braking to the reel gears, and movable forward/reverse switching means for selectively engaging the intermediate transmission gear to thereby transmit drive power of the reel motor to at least the take-up reel gear.

8. The mode switching mechanism for the recording and/or reproducing apparatus according to claim 1 comprising mode selection means for selectively moving the mode switching means during rotation of the cam gear means for selecting between either forward or reverse running for record/playback mode, a presence or an absence of music search, and fast feed mode or rewind mode.

9. The mode switching mechanism for the recording and/or reproducing apparatus according to claim 8 wherein the mode selection means is actuated by rotationally driving the reel motor in a reverse direction during rotation of the cam gear means.

10. The mode switching mechanism for the recording and/or reproducing apparatus according to claim 9 wherein the mode selection means is formed integrally with the cam gear retention means.

11. The mode switching mechanism for the recording and/or reproducing apparatus according to claim 1 wherein
when a forward rotational speed of the reel motor is set to a first rotational speed and fast feed/rewind mode, a record/playback mode in the forward-/reverse direction is set, and
when forward rotational speed is set to a second rotational speed lower than the first rotational speed, a fast feed-music search/rewind-music search mode is set.

* * * * *